US012760509B2

(12) United States Patent
Berg, Jr.

(10) Patent No.: US 12,760,509 B2
(45) Date of Patent: Oct. 13, 2026

(54) DRAIN CLEANER

(71) Applicant: MILWAUKEE ELECTRIC TOOL CORPORATION, Brookfield, WI (US)

(72) Inventor: Steven J. Berg, Jr., Wauwatosa, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 860 days.

(21) Appl. No.: 17/489,656

(22) Filed: Sep. 29, 2021

(65) Prior Publication Data

US 2022/0098849 A1 Mar. 31, 2022

Related U.S. Application Data

(60) Provisional application No. 63/232,964, filed on Aug. 13, 2021, provisional application No. 63/085,112, filed on Sep. 29, 2020.

(51) Int. Cl.
*E03F 9/00* (2006.01)
*B08B 9/043* (2006.01)
*B08B 9/045* (2006.01)

(52) U.S. Cl.
CPC ............ *E03F 9/005* (2013.01); *B08B 9/0436* (2013.01); *B08B 9/045* (2013.01)

(58) Field of Classification Search
CPC .......... E03F 9/005; E03F 9/002; B08B 9/045; B08B 9/0436; B65H 2402/412; E03C 1/302
USPC .................................................... 74/545–547
See application file for complete search history.

(56) References Cited

U.S. PATENT DOCUMENTS 1,611,549 A * 12/1926 Moore .................. G05G 1/085 16/110.1
2,455,819 A * 12/1948 Smith .................. G01B 3/1041 242/395.1
2,600,707 A 6/1952 Turnbaugh
2,603,495 A 7/1952 Hermanson
3,703,015 A 11/1972 Naeve
3,983,593 A 10/1976 Naeve
4,317,247 A 3/1982 Levine
4,557,430 A * 12/1985 Bonhard ................ B65H 75/40 242/395.1

(Continued)

FOREIGN PATENT DOCUMENTS

WO 2006112848 A1 10/2006
WO 2014193694 A1 12/2014

OTHER PUBLICATIONS

International Search Report and Written Opinion for Application No. PCT/US2021/052734 dated Feb. 22, 2022 (17 pages).

(Continued)

*Primary Examiner* — Laura C Guidotti
(74) *Attorney, Agent, or Firm* — Michael Best & Friedrich LLP

(57) ABSTRACT

A drain cleaner including a rotatable drum, a nose assembly extending forwardly of the drum, a cable housed within the drum and extendable through the nose assembly, a first drive mechanism configured to drive rotation of the drum, where the first drive mechanism is automatically driven by an external motor, and a second drive mechanism configured to drive rotation of the drum, where the second drive mechanism is manually driven by an operator.

9 Claims, 33 Drawing Sheets

(56) References Cited

U.S. PATENT DOCUMENTS

| | | | | | |
|---|---|---|---|---|---|
| 4,716,613 | A * | 1/1988 | Irwin | E03F 9/005 15/104.33 |
| 5,987,684 | A | 11/1999 | Evans | |
| 5,996,275 | A | 12/1999 | Kulish | |
| 6,158,076 | A | 12/2000 | Rutkowski et al. | |
| 6,243,905 | B1 | 6/2001 | Rutkowski | |
| 6,343,398 | B1 | 2/2002 | Silverman et al. | |
| 6,615,436 | B1 | 9/2003 | Burch, Jr. et al. | |
| 7,478,451 | B2 | 1/2009 | Rutkowski et al. | |
| 7,685,669 | B2 | 3/2010 | Rutkowski et al. | |
| 8,826,483 | B2 | 9/2014 | Rutkowski et al. | |
| 9,499,374 | B2 * | 11/2016 | Hawkins | B65H 75/40 |
| 10,626,593 | B2 | 4/2020 | Puzio et al. | |
| 10,646,905 | B2 | 5/2020 | Cole et al. | |
| 10,688,540 | B2 | 6/2020 | Bode et al. | |
| 2008/0148503 | A1 | 6/2008 | Babb et al. | |
| 2008/0173332 | A1 | 7/2008 | Zhang | |
| 2008/0244816 | A1 | 10/2008 | Babb et al. | |
| 2012/0011906 | A1 | 1/2012 | Wildauer et al. | |
| 2013/0160227 | A1 | 6/2013 | Rutkowski et al. | |
| 2017/0284078 | A1 | 10/2017 | Puzio et al. | |
| 2018/0147713 | A1 | 5/2018 | Schmauder et al. | |
| 2020/0048885 | A1 | 2/2020 | Reed et al. | |
| 2020/0080293 | A1 | 3/2020 | Krohlow et al. | |
| 2020/0208394 | A1 | 7/2020 | Puzio et al. | |

OTHER PUBLICATIONS

Extended European Search Report for Application No. 21876431.4 dated Jan. 27, 2025 (9 pages).

* cited by examiner

DRAIN CLEANER

CROSS-REFERENCE TO RELATED APPLICATIONS

This application claims priority to U.S. Provisional Patent Application No. 63/085,112 filed on Sep. 29, 2020 and U.S. Provisional Patent Application No. 63/232,964 filed on Aug. 13, 2021, the entire contents of which are incorporated herein by reference.

FIELD OF INVENTION

The present invention relates to drain cleaners and various features thereof.

BACKGROUND

Drain cleaners are used to clean dirt and debris out of drains or other conduits that collect debris in locations that are difficult to access. Drain cleaners typically have a cable or snake that is inserted into the drain to collect the debris. Some cables are manually fed into the drain, while others are driven into the drain by a motor.

SUMMARY

In one embodiment, the present disclosure provides a drain cleaner including a drum assembly and a nose assembly extending forwardly of the drum assembly. The drum assembly includes a rotatable drum and a cable housed within the drum and extendable though the nose assembly. The nose assembly includes an autofeed mechanism for feeding the cable into a drain, where the autofeed mechanism incudes a plurality of rollers and an actuating member configured to move at least one of the plurality of rollers into engagement with the cable to feed the cable along a cable axis. In some embodiments, the drain cleaner further includes a feed lock for selectively inhibiting actuation of the autofeed mechanism. In some embodiments, the drain cleaner further includes a cable lock for selectively inhibiting linear movement of the cable along the cable axis. In some embodiments, the drain cleaner further includes a first drive mechanism for driving rotation of the drum and a second drive mechanism for driving rotation of the drum. In some embodiments, the first drive mechanism is automatically driven by an external motor, such as a motor of a power tool. In some embodiments, the second drive mechanism is manually driven by an operator. Furthermore, in some embodiments, the second drive mechanism is a manual crank which may be concealed when not in use. In some embodiments, the drain cleaner further includes a cable anchor for securing the cable within the drum.

In another embodiment, the present disclosure provides a drain cleaner including a rotatable drum, a nose assembly extending forwardly of the drum, a cable housed within the drum and extendable through the nose assembly, a first drive mechanism configured to drive rotation of the drum, where the first drive mechanism is automatically driven by an external motor, and a second drive mechanism configured to drive rotation of the drum, where the second drive mechanism is manually driven by an operator.

In another embodiment, the present disclosure provides a drain cleaner a rotatable drum, a nose assembly extending forwardly of the drum, a cable housed within the drum and extendable through the nose assembly, where the cable includes a plurality of cable threads, and a cable anchor configured to secure the cable within the drum, where the cable anchor is formed on an inner wall of the drum and includes a plurality of anchor threads, and where the anchor threads are selectively engagable with the plurality of cable threads.

In yet another embodiment, the present disclosure provides a drain cleaner including a rotatable drum including a front wall and a rear wall, a nose assembly extending forwardly of the drum proximate the front wall, a cable housed within the drum and extendable through the nose assembly, a cable lock configured to selectively engage the cable to inhibit linear movement of the cable, where the cable lock is positioned adjacent the front wall of the drum, and a guard extending rearward from the nose assembly towards the front wall of the drum, where the guard is arranged to at least partially shield the cable lock.

In yet another embodiment, the present disclosure provides a drain cleaner including a drum rotatable about a drum axis, a nose assembly extending forwardly of the drum, a cable housed within the drum and extendable through the nose assembly, and an autofeed mechanism disposed on the nose assembly, where the autofeed mechanism is actuable to feed the cable into a drain. The autofeed mechanism includes a plurality of rollers, and an actuating member configured to move at least one of the plurality of rollers into engagement with the cable, the actuating member pivotable in a direction perpendicular to the drum axis.

In yet another embodiment, the present disclosure provides a drain cleaner including a rotatable drum, a nose assembly extending forwardly of the drum, a cable housed within the drum and extendable through the nose assembly, an autofeed mechanism disposed on the nose assembly, where the autofeed mechanism is actuable to feed the cable into a drain, and a feed lock configured to selectively inhibit actuation of the autofeed mechanism.

Other aspects of the invention will become apparent by consideration of the detailed description and accompanying drawings.

Figure 1:
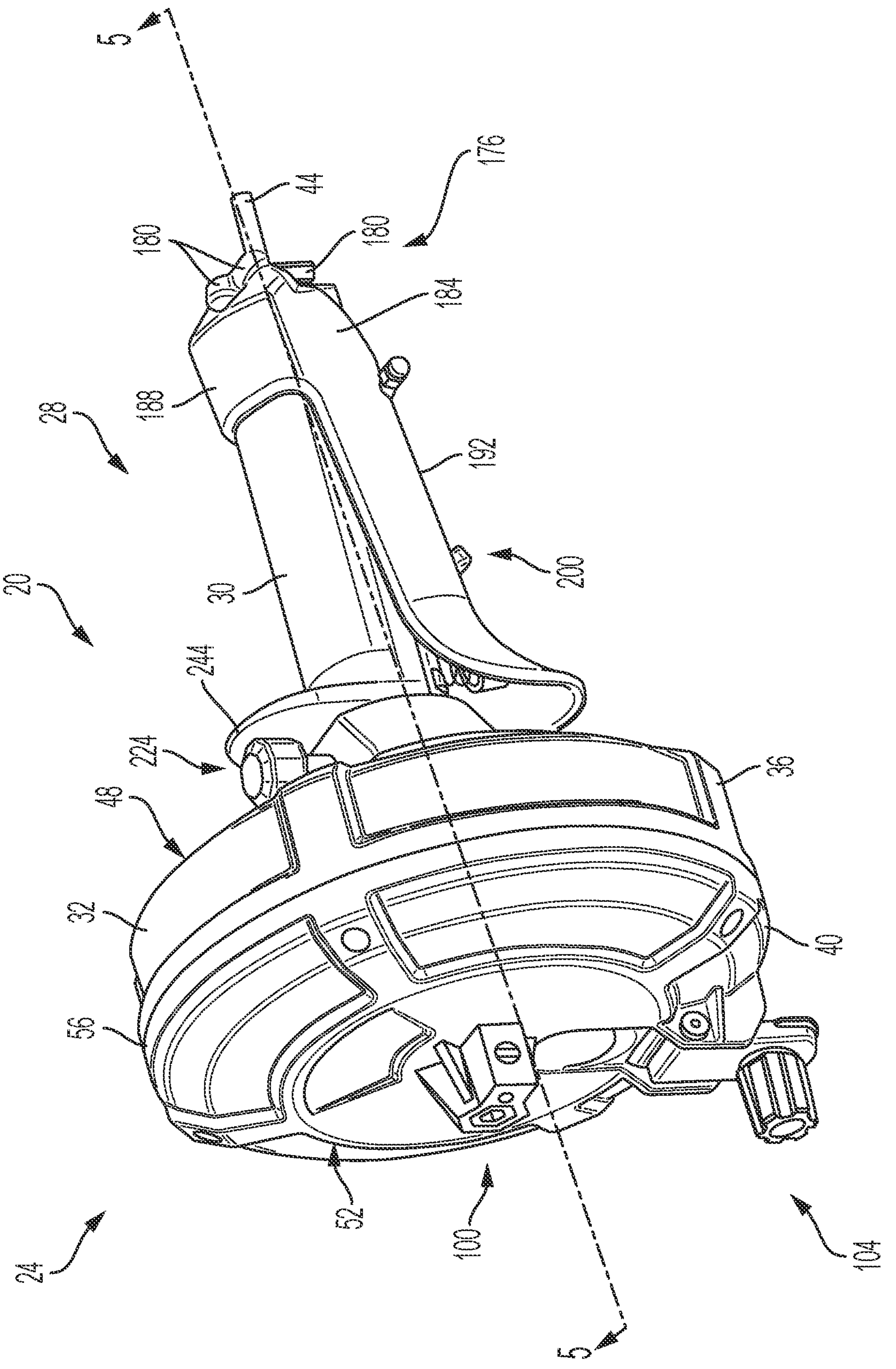
FIG. 1 is a rear perspective view of a drain cleaner according to one embodiment.
Figure 2:
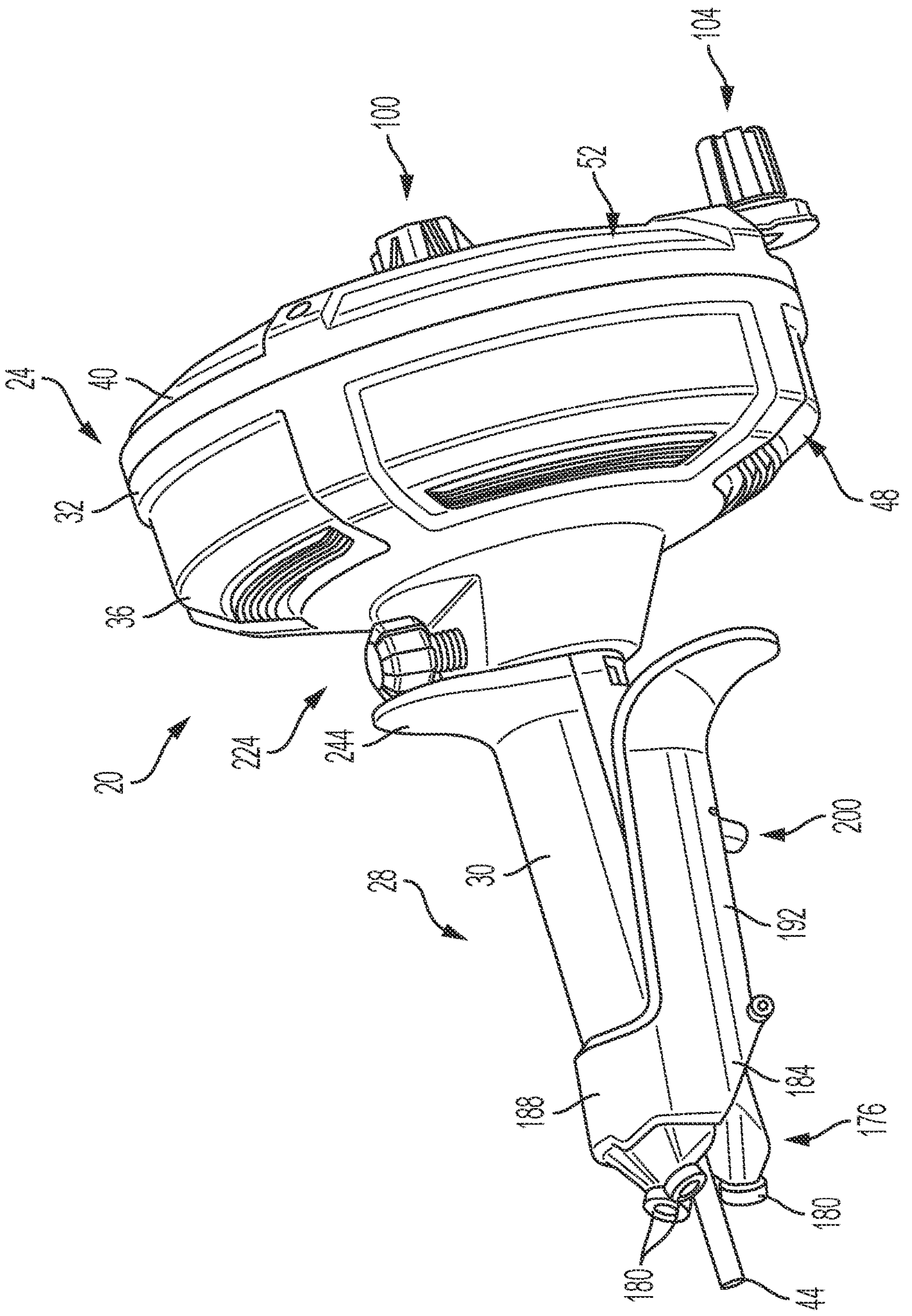
FIG. 2 is a front perspective view of the drain cleaner shown in FIG. 1.
Figure 3:
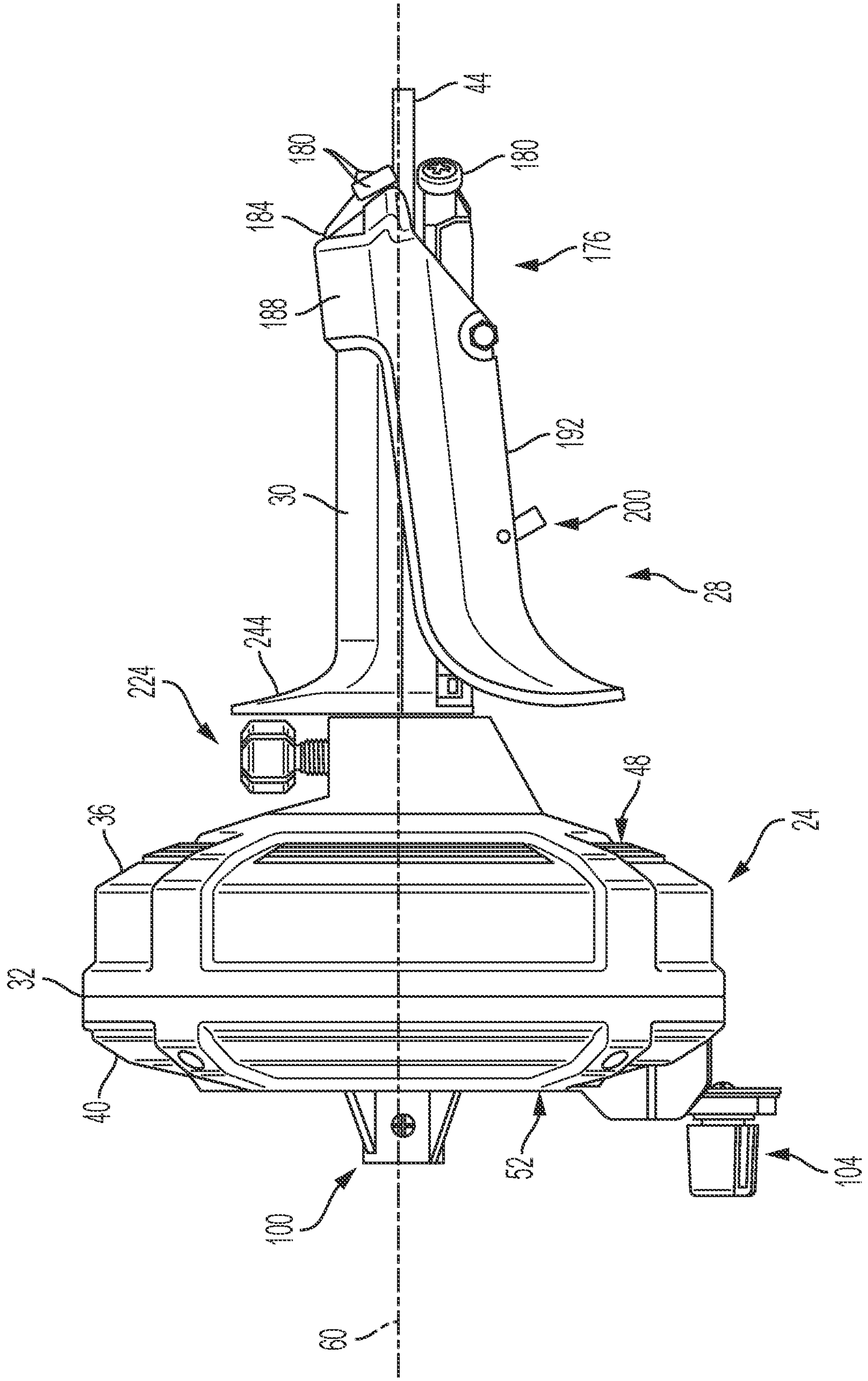
FIG. 3 is a side plan view of the drain cleaner shown in FIG. 1.
Figure 4:
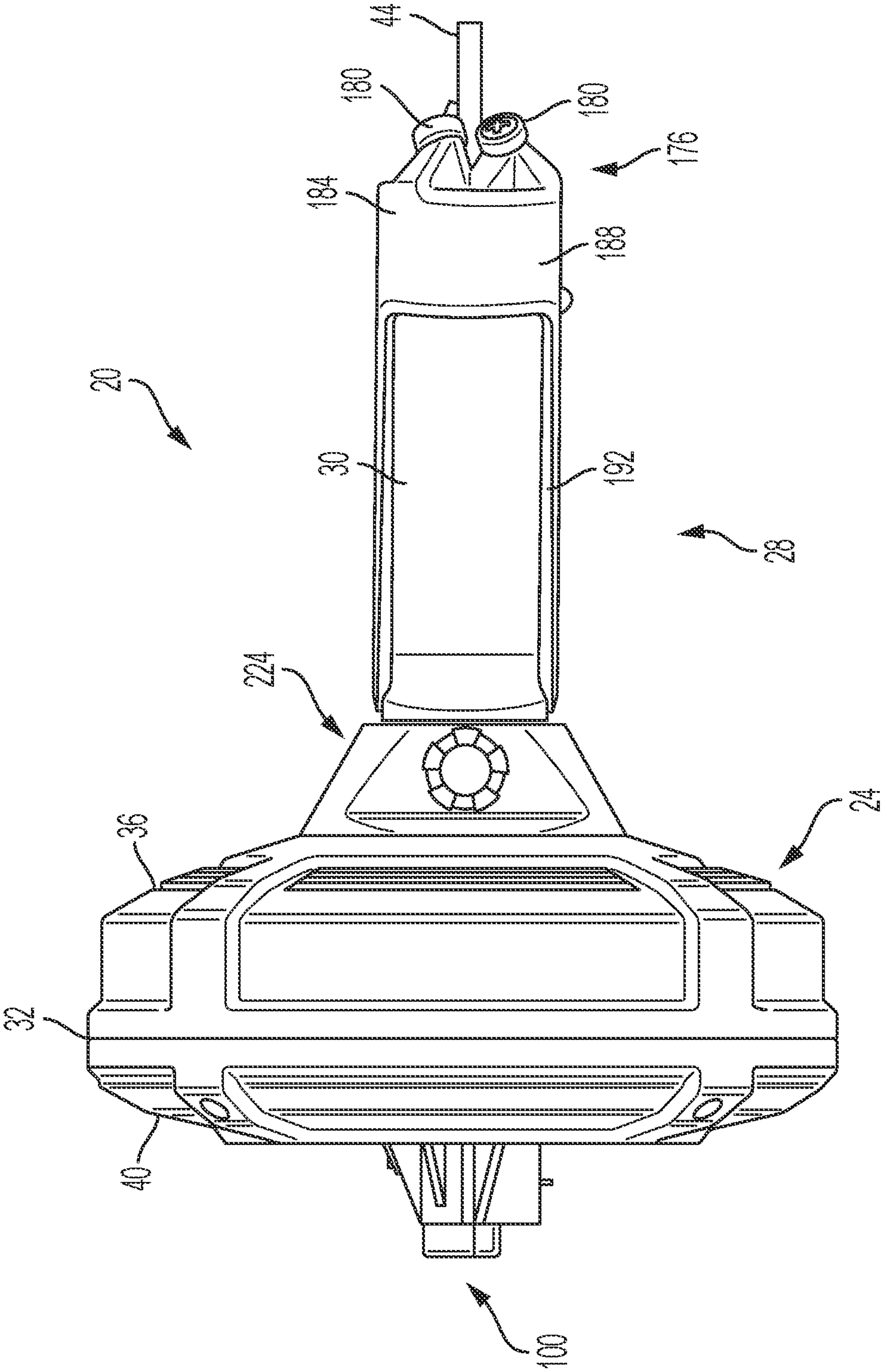
FIG. 4 is a top plan view of the drain cleaner shown in FIG. 1.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Some components annotated in the drawings may include like numbers followed a letter (such as a, b, or c). These like components distinguished by letters may be the same or similar components, or may be a different embodiment of the same component. As will be understood from the description, like components may be switched between one another to form different embodiments of a drain cleaner.

DETAILED DESCRIPTION

Drain Cleaner

FIGS. 1-5 illustrate a drain cleaner 20 according to one embodiment of the present disclosure. The illustrated drain cleaner 20 includes a drum assembly 24 and a nose assembly 28 extending forwardly of the drum assembly 24. The drum assembly 24 includes a drum 32 for housing a flexible cable 44 (or spring or snake), and a drive mechanism for rotating the drum 32. The drum 32 may be formed of a clamshell housing including a first housing 36 and a second housing 40. In some embodiments, the drum 32 is sealed (or is water tight) so that fluid may not enter or exit the drum 32 between the clamshell housings 36, 40. Water may only enter and exit through the nose 28 of the drain cleaner 20. The illustrated drum 32 has a generally cylindrical shape with a front wall 48 facing towards the nose assembly 28, a rear wall 52 facing away from the nose assembly 28, and an annular wall 56 extending between the front wall 48 and the rear wall 52. As will be described in greater detail, the drum 32 is rotatable about an axis 60 (FIG. 3) extending between the front wall 48 and the rear wall 52.

The nose assembly 28 may generally be used as a handle to help the operator maneuver the drain cleaner 20. The nose assembly 28 includes an elongated body 64 extending along the axis 60 and providing a pathway for the cable 44 to pass through. The cable 44 also extends along the axis 60 and may move linearly along the axis 60. The elongated body 64 may be rotatably fixed to the drum 32 such that rotation of the drum 32 causes rotation of the elongated body 64. In some embodiments, the elongated body 64 may be integrally formed with the first housing 36 of the drum assembly 24. In other embodiments, the elongated body 64 may be a separate element from the first housing 36.

The nose assembly 28 further includes a handle 30 to provide a gripping area for an operator to hold while operating the drain cleaner 20. In the illustrated embodiment, the handle 30 extends circumferentially around the elongated body 64 and along the axis 60. In some embodiments, the handle 30 extends only partially around the elongated body 64 while in other embodiments, the handle 30 extends around the entire circumference of the elongated body 64. Furthermore, in some embodiments, the handle 30 may have a generally cylindrical shape with an axis extending in a similar direction as the cable axis 60. The drum 32 and the elongated body 64 may rotate relative to the handle 30. In other words, the handle 30 may not be rotatably fixed to the elongated body 64 and/or the drum 32. Accordingly, the elongated body 64 may be rotatable within the handle 30 of the nose assembly 28. In some embodiments, the drain cleaner 20 may also include additional handles or grips to help an operator maneuver the drain cleaner 20. Similarly, in some embodiments, the drain cleaner 20 may include a stand or a base to help support the drain cleaner 20 in an upright position on a surface.

Additionally, the nose assembly 28 includes autofeed mechanism 176, which may be used to feed (extend or retract) the cable 44 from the drain. One embodiment of an autofeed mechanism 176 is described in detail herein.

Figure 5:
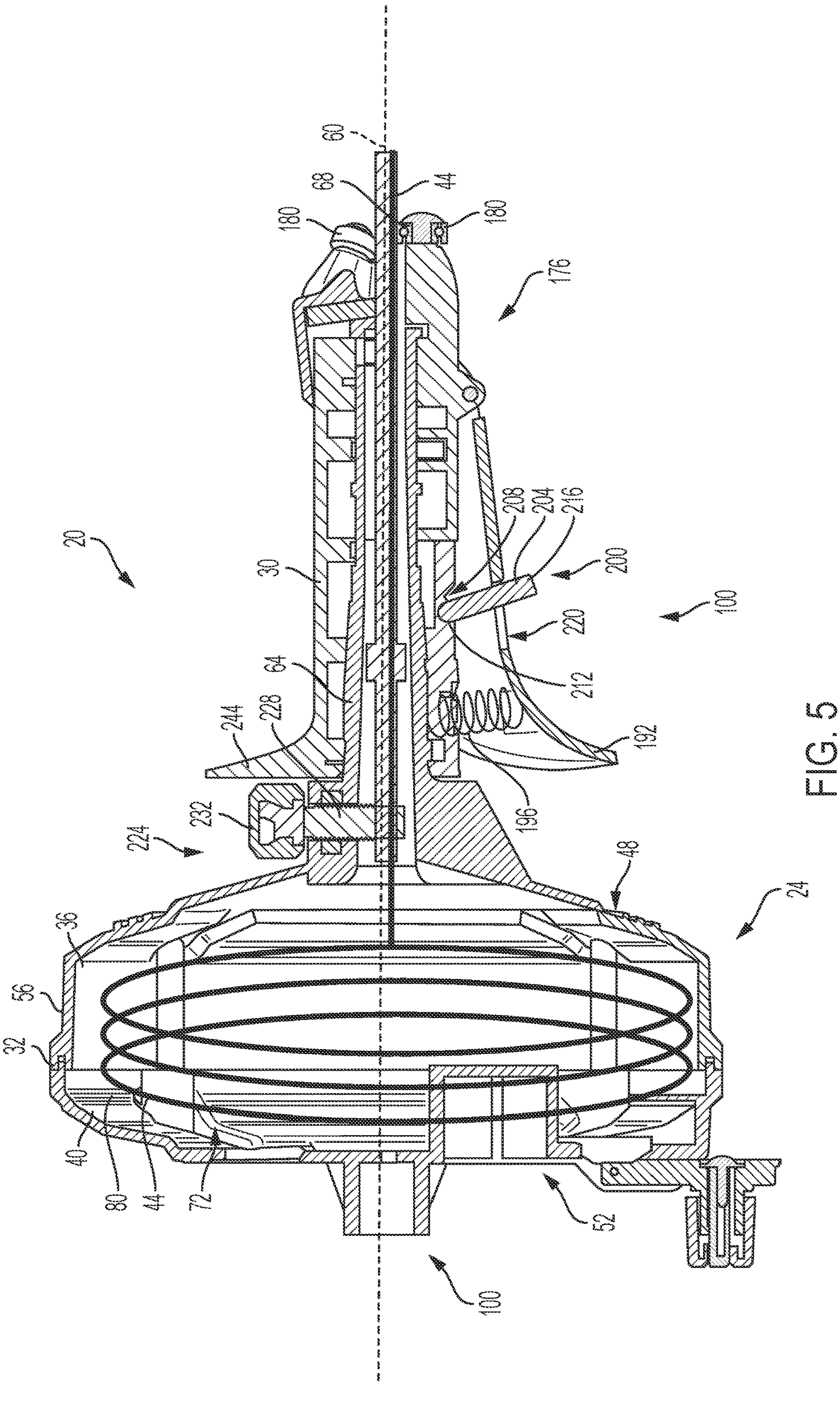
FIG. 5 is a cross-sectional view of the drain cleaner taken along section line 5-5 of FIG. 1.
Figure 6:
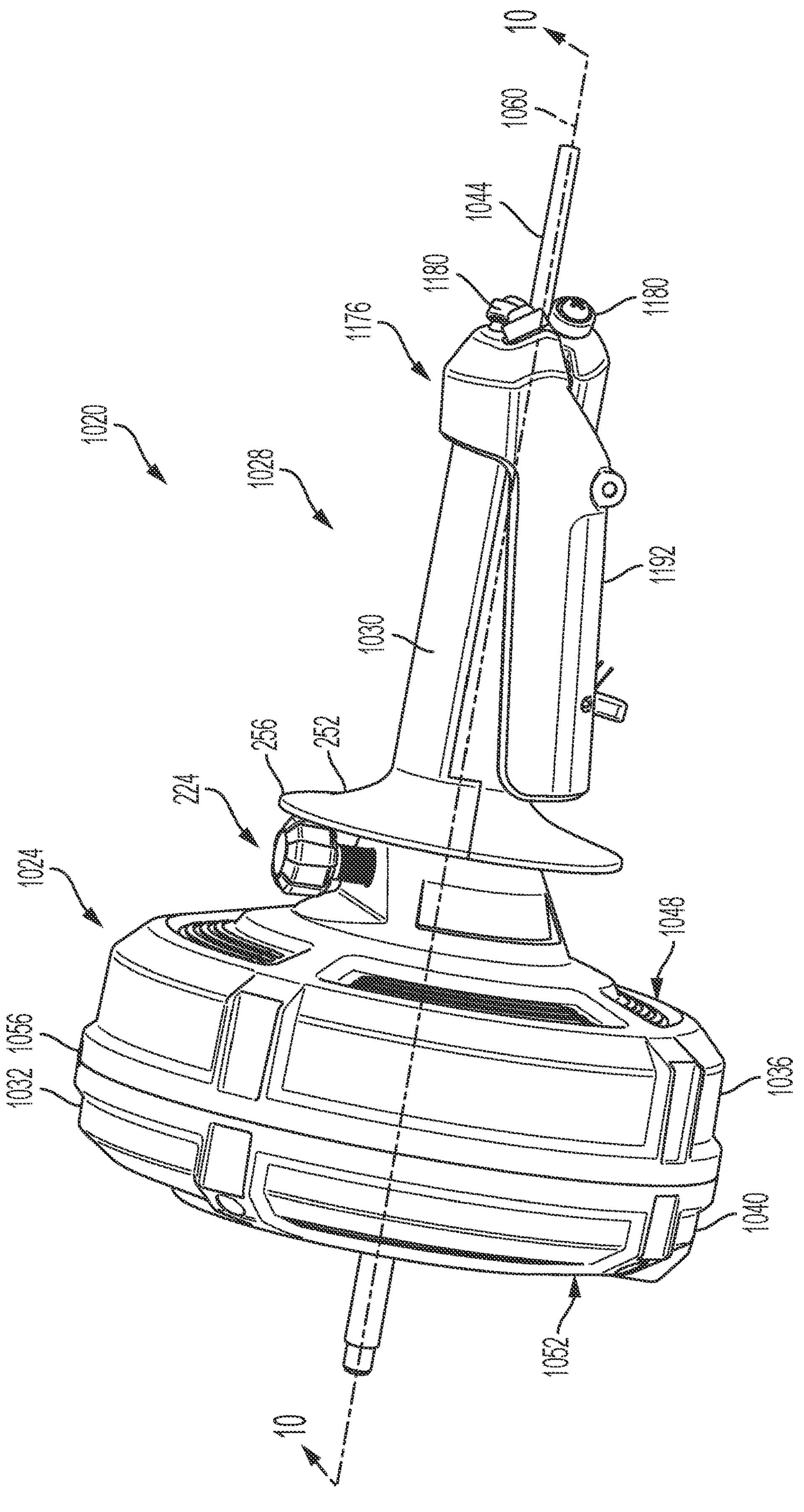
FIG. 6 is a front perspective view of a drain cleaner according to another embodiment.
Figure 7:
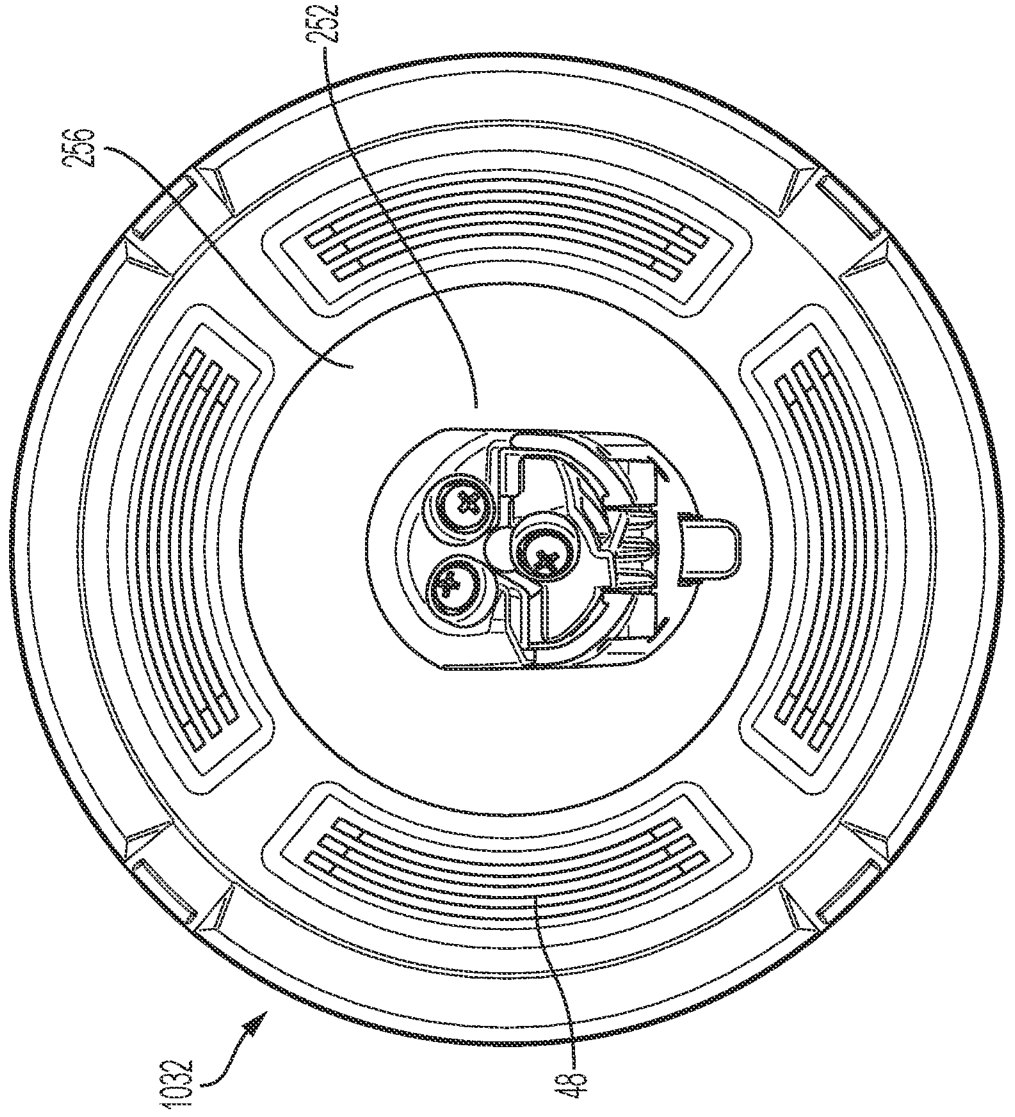
FIG. 7 is a front plan view of the drain cleaner of FIG. 6.
Figure 8:
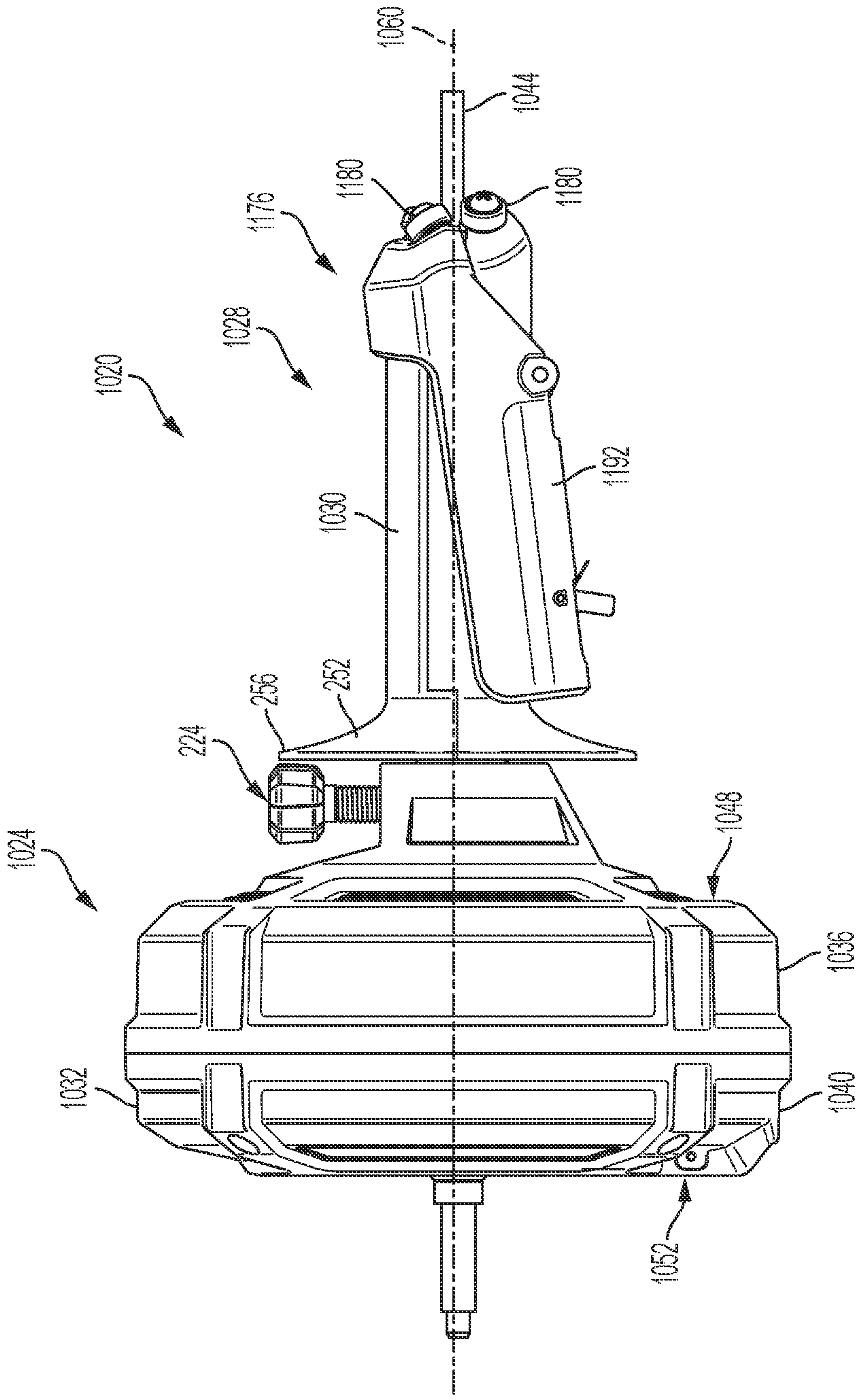
FIG. 8 is a side plan view of the drain cleaner of FIG. 6.
Figure 9:
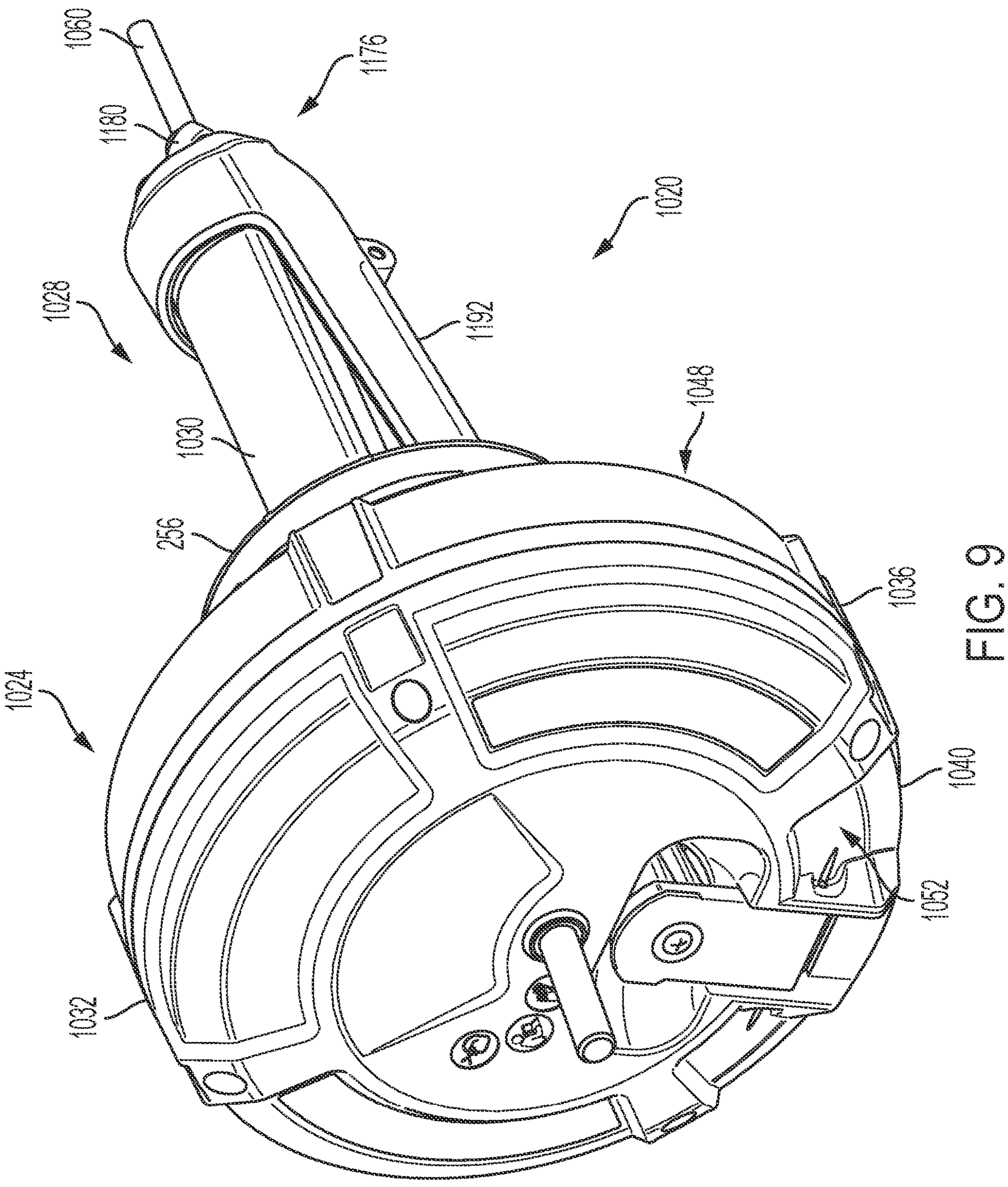
FIG. 9 is a rear perspective view of a drain cleaner of FIG. 6.
Figure 10:
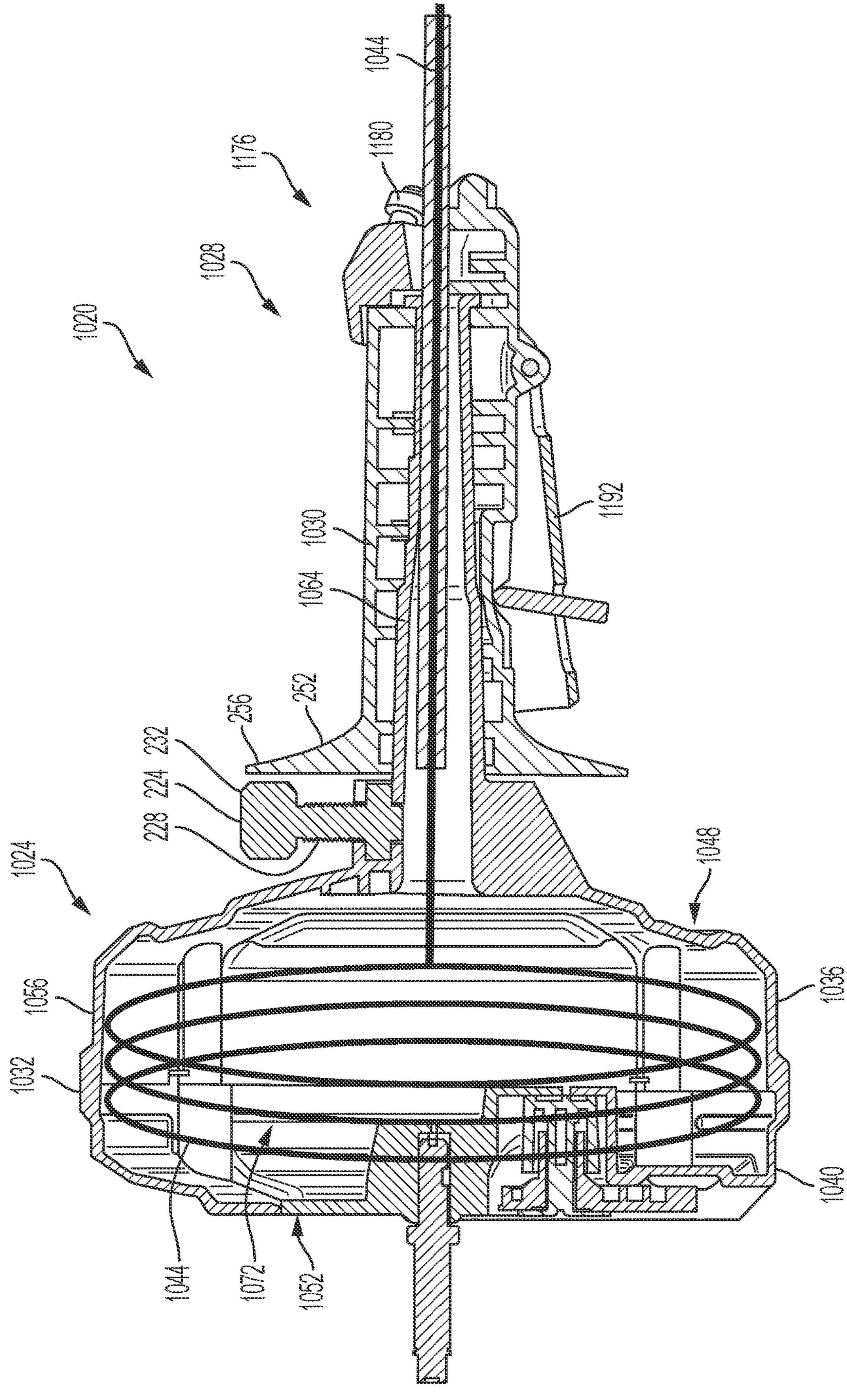
FIG. 10 is a cross-sectional view of the drain cleaner taken along section line 10-10 of FIG. 6.

Referring to FIGS. 5 and 6, the cable 44 is at least partially stored within the drum assembly 24 and extends through the nose assembly 28. Specifically, a portion of the cable 44 is wound up and stored within the drum 32 while another portion of the cable 44 extends through the nose assembly 28 and along the axis 60 (also referred to as the cable axis 60). A first end 68 of the cable 44 is insertable into a drain, or other conduit, for cleaning debris and removing clogs within the drain. In some embodiments, the cable 44 may include an auger head or other tool attachment at a cleaning end of the cable 44 (i.e., the end inserted into the drain) to help break up debris.

As previously mentioned, the drum 32 is rotatable about the axis 60. The rotational force of the drum 32 is transmitted to the cable 44 to cause the cable 44 to spin. Specifically, at least a portion of the cable 44 is wound within the drum 32 and is biased radially outward against the annular wall 56 of the drum 32. Accordingly, friction between an inner wall 72 (i.e., including either the front or the rear side of the drum) of the drum 32 and the cable 44 causes the cable 44 to rotate or spin with the drum 32. Additionally, rotational force may be transmitted from the drum 32 to the cable 44 through a cable anchor, as described in further detail below. This may be particularly helpful once a large portion of the cable 44 is extended out of the drum 32 and not available to frictionally engage the inner wall 72 of the drum 32.

FIGS. 6-10 illustrate a drain cleaner 1020 according to another embodiment of the present disclosure. The drain cleaner 1020 illustrated in FIGS. 6-10 includes many similar features as the drain cleaner 20 illustrated in FIGS. 1-5, therefore, only a brief description will be provided. Furthermore, it should be understood that some features described herein may be described with respect to only one of the disclosed embodiments of a drain cleaner. However, the features described herein may be included on one or both of the embodiments of the drain cleaner shown in FIGS. 1-10, or in various combinations with one another.

The illustrated drain cleaner 1020 includes a drum assembly 1024 and a nose assembly 1028 extending forwardly of the drum assembly 1024. The drum assembly 1024 includes a drum 1032 for housing a flexible cable 1044 (or spring or snake), and a drive mechanism for rotating the drum 1032. The cable 1044 is stored within the drum 1024 and presses against the inner wall 1072 of the drum 1032. The drum 1032 may be formed of a clamshell housing including a first housing 1036 and a second housing 1040. The illustrated drum 1032 has a generally cylindrical shape with a front wall 1048 facing towards the nose assembly 1028, a rear wall 1052 facing away from the nose assembly 1028, and an annular wall 1056 extending between the front wall 1048 and the rear wall 1052. The drum 1032 is rotatable about an axis 1060 extending between the front wall 48 and the rear wall 1052. The nose assembly 1028 includes an elongated body 1064 extending along the axis 1060 and providing a pathway for the cable 1044 to pass through. The cable 1044 also extends along the axis 1060 and may move linearly along the axis 1060. The elongated body 1064 may be rotatably fixed to the drum 1032 such that rotation of the drum 1032 causes rotation of the elongated body 1064. The nose assembly 1028 further includes a handle 1030 extending circumferentially around the elongated body 1064 and along the axis 1060. The drum 1032 and the elongated body 1064 may rotate relative to the handle 1030. Additionally, the nose assembly 1028 includes autofeed mechanism 1176, which may be used to feed (extend or retract) the cable 1044 from the drain. The autofeed mechanism includes an actuator 1192 and a set of rollers 1180. A detailed description of an autofeed mechanism is further described herein.

Cable Anchor

Figure 11:
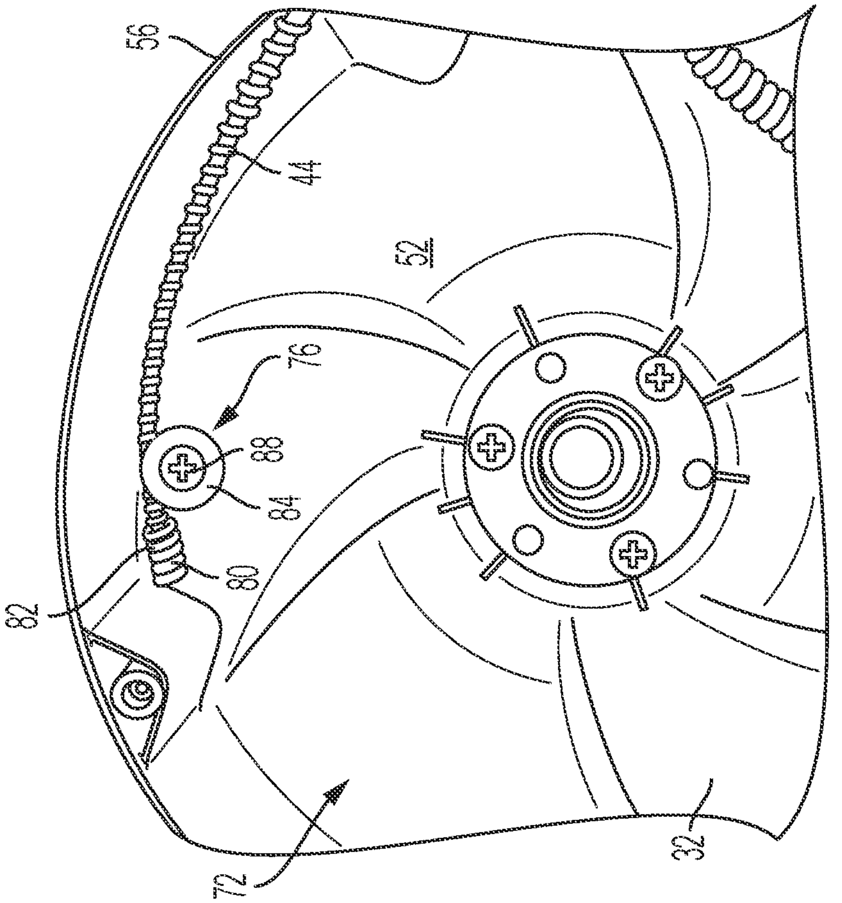
FIG. 11 is a detailed view of a cable anchor according to one embodiment.
Figure 12:
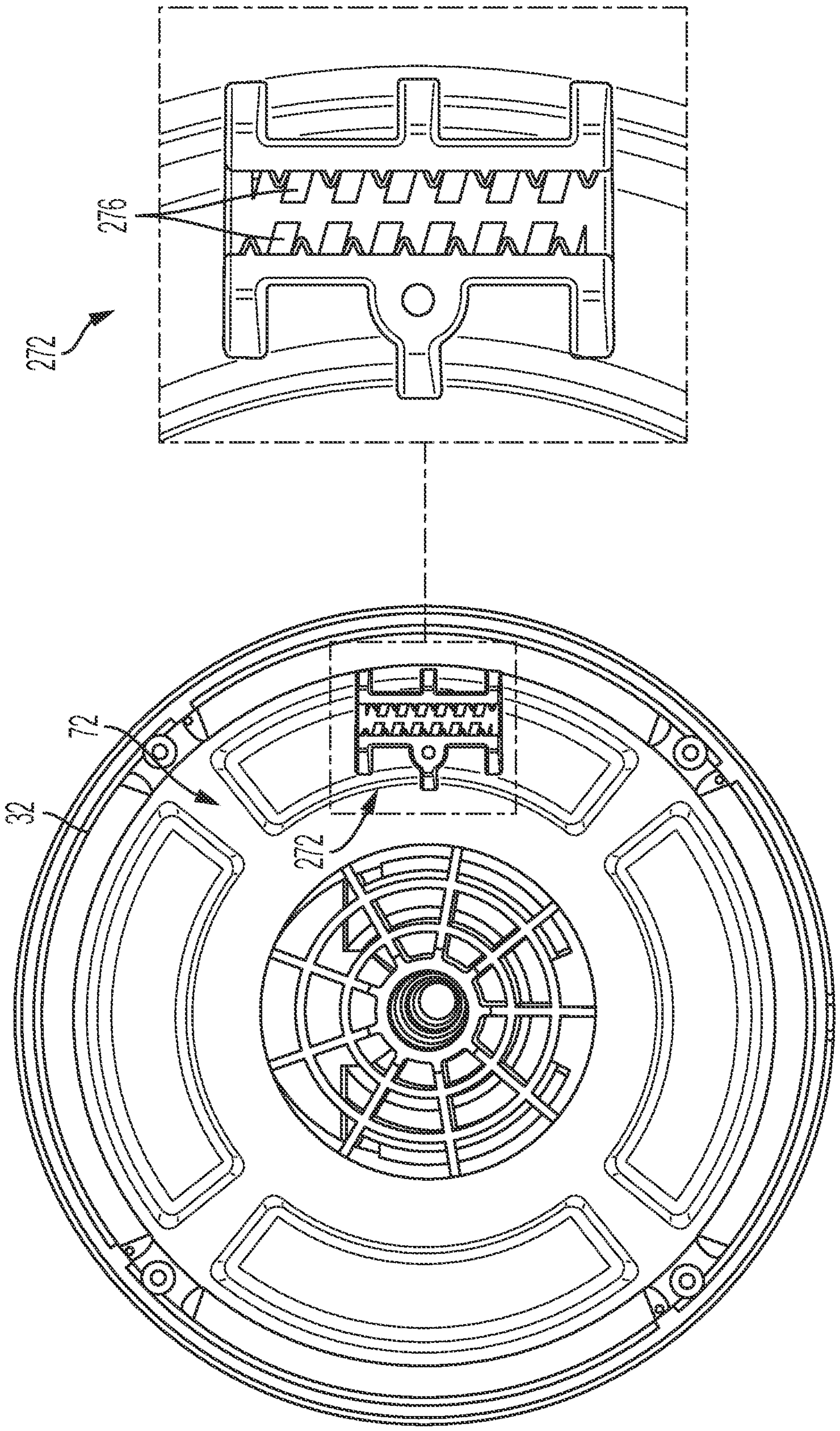
FIG. 12 is detailed view of a cable anchor according to another embodiment.

The drain cleaner 20, 1020 may include a cable anchor to secure the cable to a portion of the drum. FIG. 11 illustrates a cable anchor 76 to secure the cable 44 to a portion of the drum 32 and reduce the amount of slippage between the cable 44 and the inner wall 72 of the drum 32. The cable anchor 76 may also inhibit the cable 44 from being completely driven or pulled out of the drum 32. In the illustrated embodiment, the cable anchor 76 pinches a second end 80 of the cable 44 against the inner wall 72 of the drum 32 to inhibit the cable 44 from slipping. The illustrated cable anchor 76 includes a washer 84 and a bolt 88, which pinch the cable 44 against a corner of the drum 32 where the end wall (either front wall 48 or rear wall 52) and the annular wall 56 meet. Additionally, in the illustrated embodiment, the second end 80 of the cable 44 includes a bulge 82 to provide additional grip for the cable anchor 76. The bulge 82 is a portion of the cable 44 that has a larger diameter than the rest of the cable 44. The bulge 82 provides an additional surface for the cable anchor 76 to pinch and frictionally engage. In other embodiments, different cables may be used. For example, the cable 44 may not include a bulge. Also, different types of cable anchors 76 may be used to secure the cable 44 to the drum 32. Similarly, some cable anchors 76 may simply reduce slippage of the cable 44 relative to the drum 32 rather than fixing a portion of the cable 44 to the drum 32.

FIGS. 12-15 provide another embodiment of a cable anchor 272. As shown, the cable anchor 272 is formed on the inner wall 72 of the drum 32 to secure the cable 44 to the drum 32 as the drum 32 rotates. The illustrated cable anchor 272 includes a series of anchor threads 276, (or partial threads) that are configured to engage with corresponding threads 280 of the cable 44. In particular, the cable 44 may be placed within the threaded section and then secured in place so that the threading of the cable 44 may not be able to de-thread out of the cable anchor 272. In other embodiments, the cable 44 may be threaded into the cable anchor 272 to provide a secure connection. The threaded connection provides for a more robust connection between the drum 32 and the cable 44 to resist the cable 44 being unintentionally disconnected or removed from the drum 32. The cable anchor 272 may be integrally formed in the inner wall 72 of the drum 32 or may be a separate piece that is secured to the inner wall 72 of the drum 32. Likewise, in some embodiments, the anchor threads 276 may extend around a greater or a small portion of the cable circumference.

Figure 13:
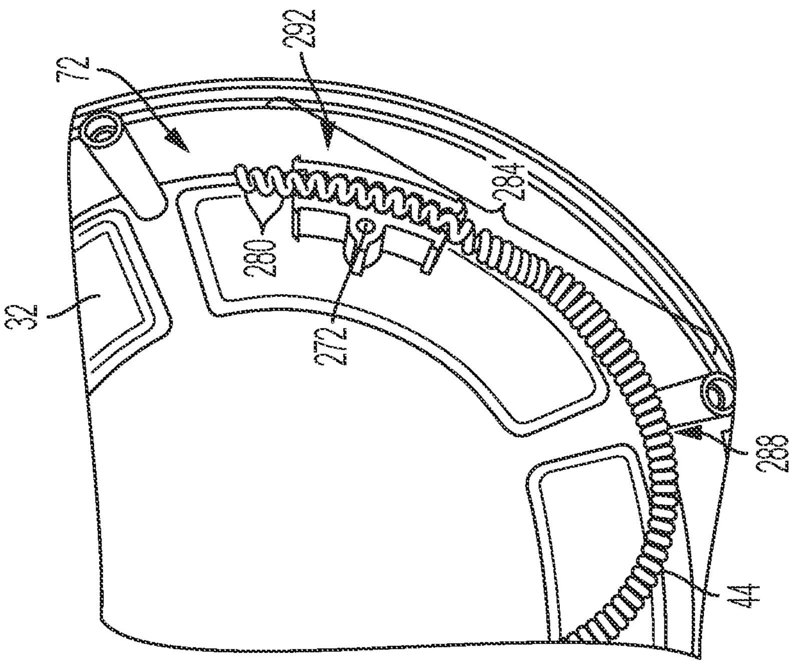
FIG. 13 illustrates an exemplary embodiment of a cable for use with the cable anchor of FIG. 12.
Figure 14:
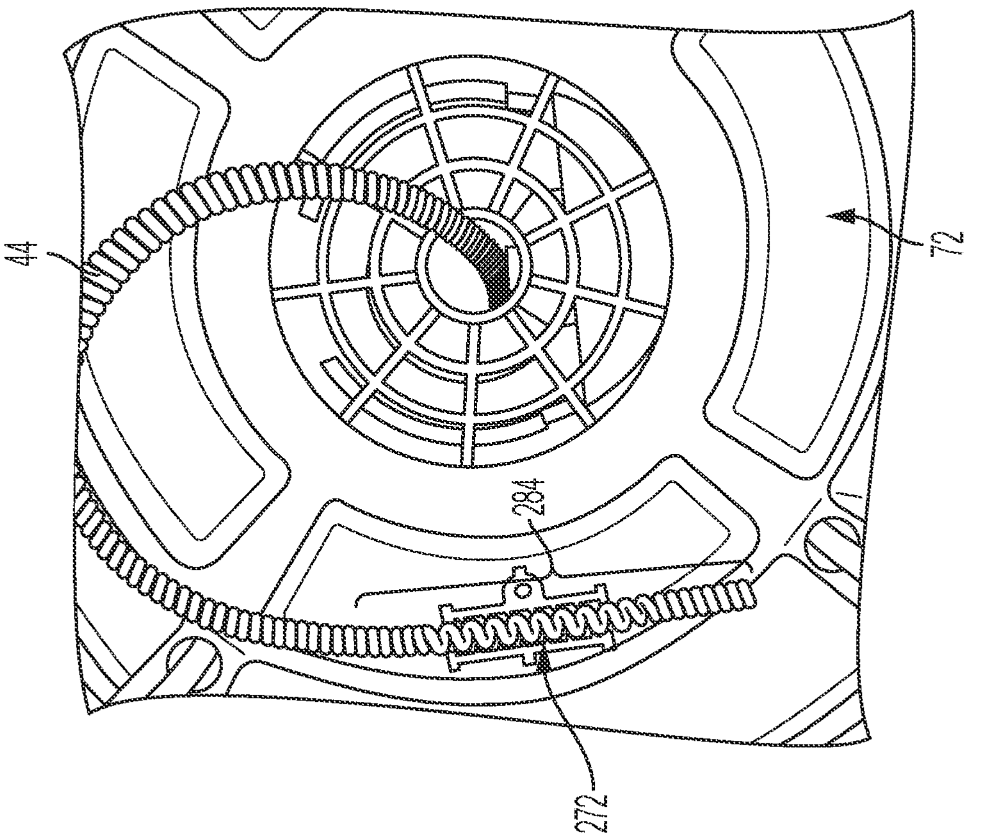
FIG. 14 illustrates another exemplary embodiment of a cable for use with the cable anchor of FIG. 12.
Figure 15:
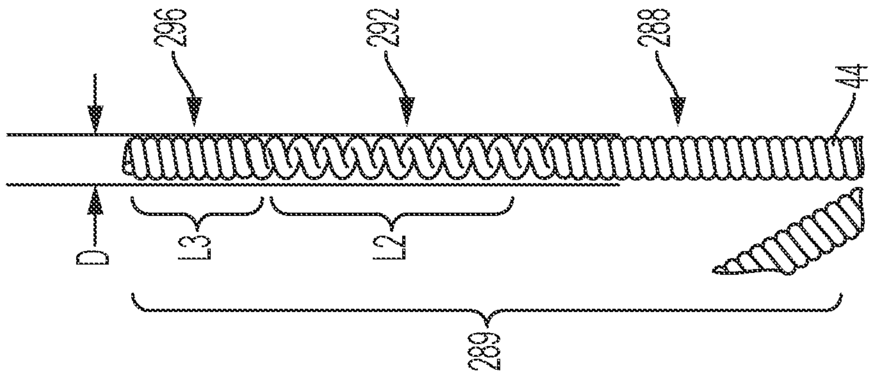
FIG. 15 is a detailed view of a cable for use with the cable anchor of FIG. 12.

FIGS. 13-15 illustrate embodiments of a cable 44, which may be used with the cable anchor 272. The cable 44 includes a multi-pitch section 284 for engaging with the cable anchor 272. The multi-pitch section 284 is located on or near an anchor end end of the cable 44 where the cable 44 is coupled to the cable anchor 272. The anchor end of the cable 44 is the end of the cable opposite the cleaning end of cable 44, where the cable 44 is inserted into the drum 32. The multi-pitch section 284 includes different portions of the cable 44, which have different pitches. The multi-pitch section 284 may have two or more different pitched sections. For example, the cable 44*a* shown in FIGS. 13 and 23B includes a multi-pitch section 284 having two sections whereas the cable 44*b* shown in FIG. 15 includes a multi-pitch section 284 having three sections. The multi-pitch section 284 of the cable 44 includes a first portion 288 having a first pitch and a second portion 292 having a second pitch. In the illustrated embodiment, the first portion 288 having the first pitch refers to the majority of the length of the cable 44. In other words, the cable 44 is primarily wound at a first pitch (i.e., the primary pitch). However, a terminating end of the cable 44 (i.e., the very end of the cable) includes a second portion 292 having a second pitch, where the second portion 292 only extends along a relatively short length of the cable 44, and where the second pitch is different than the first pitch. The second pitch (or secondary pitch) is generally a greater pitch than the first pitch. For example, in some embodiments, the pitch of the second section 292 may be twice the pitch of the first section 288.

Furthermore, in some embodiments, the multi-pitch section 284 may include a third portion 296 on the terminal end of the cable 44 having a third pitch. For example, the cable 44 shown in FIG. 15 includes a third portion 296, while the cable 44 shown in FIG. 13 does not include a third portion 296. The third portion 296 includes a pitch that is different than the pitch of the second portion 292. In particular, the pitch of the second portion 292 is generally greater than the pitch of the third portion 296. By creating a third portion 296 with a different pitch than the second portion 292, the cable 44 is further secured within the cable anchor 272 because the different pitches inhibit de-threading of the cable 44 from the cable anchor 272. However, the third portion 296 may have a pitch that is the same as the first pitch. In this embodiment, the only portion of the multi-pitch section 284 that includes a pitch which is different from the rest of the cable 44 is the second portion 292. However, in other embodiments, the first pitch, the second pitch, and the third pitch may all be different from one another. In some embodiments, the third portion 296 may be omitted.

One benefit of the embodiments illustrated in FIGS. 13 through 15 is that the cable 44 may have a uniform diameter D along a length of the cable 44. This allows the cable 44 to be secured to the cable anchor 272 without including any bulges in the cable 44 necessary to help maintain the cable 44 in the drum 32. For example, as shown in the embodiment of FIG. 11, some cables 44 may include a bulge 82 to help secure the cable 44 to the drum 32. However, in the embodiment shown in FIGS. 13-15, the cable 44 has a uniform diameter D (or generally uniform diameter D) along the length of the cable. It should be understood that the first end 68 of the cable 44 may still have shapes and sizes that differ from, or even exceed, the diameter D of the cable 44, so long as the portion of the cable 44 which is threaded through the nose assembly 28 includes a uniform diameter D. For example, the cable 44 may include a bulbus first end 68 or an accessory attachment with a different diameter than the diameter D of the cable 44.

By creating a cable 44 of uniform diameter, the nose assembly 28 may be made smaller while still being able to receive the cable 44 as it extends through the nose assembly 28. At times the cable 44 needs to be threaded through the nose assembly 28. For example, some cables 44 have a first end 60 with a bulbous section for breaking up debris. Therefore, when replacing a cable 44, the cable 44 must be threaded through the nose assembly 28 in order to be received within the drum 32. When this happens, the nose assembly 28 must have a cable path that is large enough to handle the section of the cable 44 with the largest diameter. Therefore, by creating a cable 44 with a uniform diameter D, the cable path does not need to accommodate a larger diameter. In particular, the body 64 of the nose assembly 28 may have a smaller diameter because the body 64 does not need to accommodate a cable 44 with a bulge or section of the cable 44 with a greater diameter which may need to pass through the body 64.

Similarly, the spacing between the rollers 180 may be smaller when accommodating a cable 44 with a uniform diameter. The tighter arrangement of the rollers 180 and the narrower body 64 provide for a cable path that reduces the amount of shifting the cable experiences as it is extended and retracted through the nose assembly 28. For example, if the cable path included larger openings, the cable 44 would have the ability to move a greater amount to the right and to the left. This shifting of the cable 44 may make it more difficult for the rollers 180 to engage the cable 44 when the autofeed mechanism is actuated. For example, if the cable 44 shifts too much to one side, the roller 180 on the opposite side may not be able to reach the cable 44 or properly engage the cable 44 during autofeed operation. Alternatively, if the cable 44 shifts too much to one side, the cable 44 may get pinched out of center between two rollers 180, reducing the effective autofeed of the cable 44. Therefore, the uniform diameter of the cable 44 allows the cable path through the rollers 180 and the nose assembly 28 to be smaller and more centered, and thus, results in improved cable containment and feeding capabilities.

FIG. 15 provides an exemplary embodiment of a cable 44 for use with the cable anchor 272. The cable 44 includes a multi-pitch section 284 where the first portion 288 has a pitch of about 2.15 and the second portion 292 has a pitch of about 4.3. Therefore, in this embodiment, the pitch of the second portion 292 is double the pitch of the first portion 288. Furthermore, the exemplary cable of FIG. 15 includes a third portion 296, which has the same pitch as the first portion 288 (i.e., a pitch of 2.15). However, in other embodiments, different pitch combinations may be used in the multi-pitch section 284. Additionally, in the exemplary embodiment of FIG. 15, the second portion 292 of the multi-pitch section 284 has a length L2 of between 40 and 50 mm, and the third portion 296 of the multi-pitch section 284 has a length L3 of between 20 and 30 mm. However, the first, second, and third portions of the multi-pitch section 284 may include different combinations of lengths. Furthermore, other pitches, diameters, and lengths may be used with other embodiments of a cable 44.

First Drive Mechanism

FIGS. 16-20 illustrate various drive mechanisms for use with the drain cleaners 20 and 1020. Rotation of the drum 32 and cable 44 may have dual purposes. For example, rotation of the drum 32 and cable 44 may be used to feed (i.e., extend or retract) the cable 44 into or out of a drain. Additionally, rotation of the drum 32 and cable 44 may allow the extended portion of the cable 44 to spin within the drain and dislodge debris, which may be trapped along the walls of the drain. Rotation of the drum 32 is driven by a drive mechanism. The illustrated drain cleaner 20 includes a first drive mechanism 100, which may be driven by a motor (not shown), and a second drive mechanism 104, which may be manually driven by an operator. In some embodiments, the drain cleaner 20 may include only a single drive mechanism.

The illustrated first drive mechanism 100 is a quick release mechanism, which may be selectively coupled to a power tool, such as drill driver or other rotatable power tool. The power tool includes a motor which may transmit a rotational force to the drum 32 via the first drive mechanism 100. In the illustrated embodiment, the first drive mechanism 100 is disposed on the rear wall 52 of the drum 32 and extends rearwardly of the drum 32. The first drive mechanism 100 is positioned centrally on the second housing 40 such that the first drive mechanism 100 is coaxial with the drum 32. Furthermore, the first drive mechanism 100 is rotatably fixed relative to the drum 32 such that rotation of the first drive mechanism 100 causes rotation of the drum 32 about the axis 60.

Figure 16:
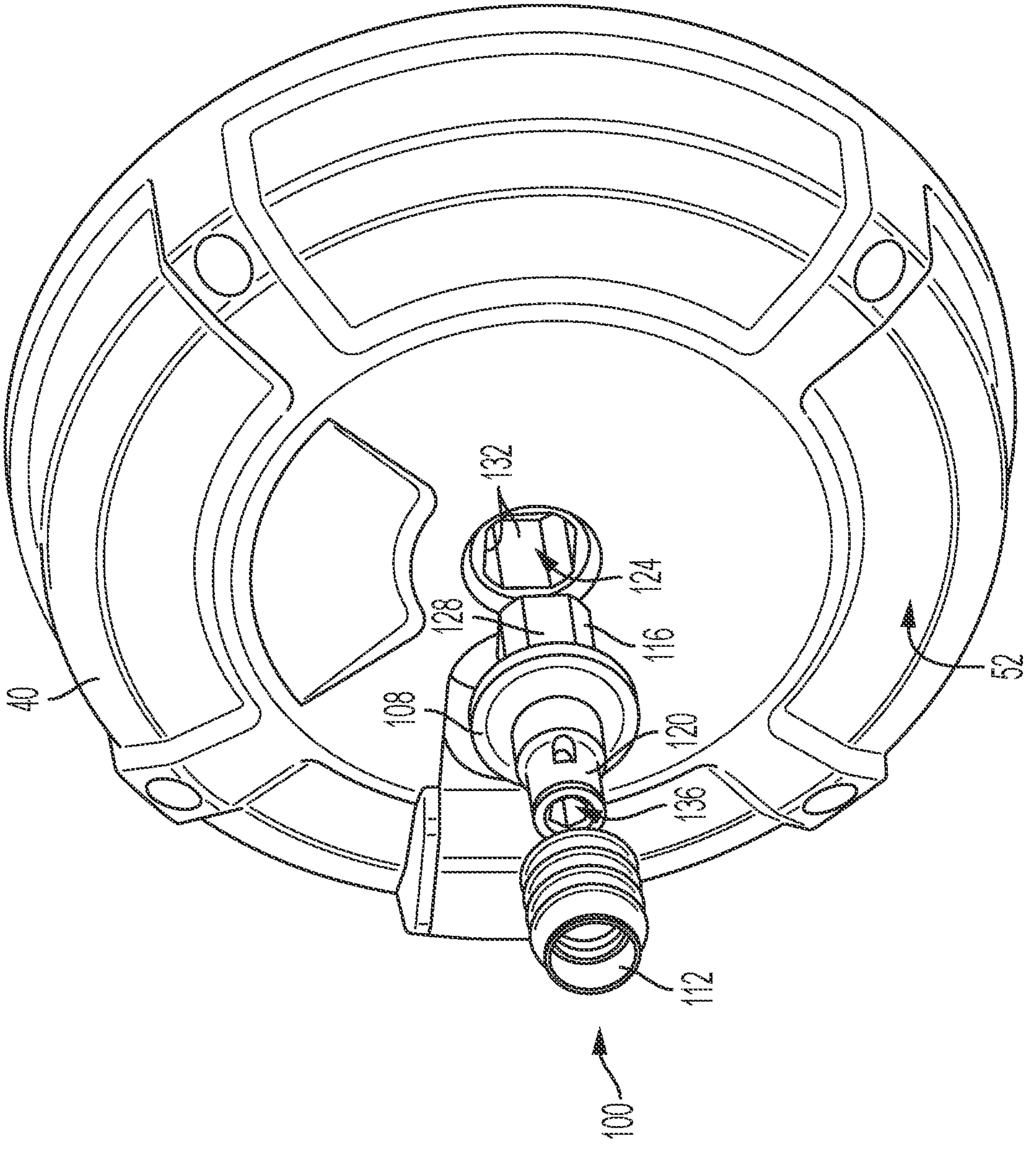
FIG. 16 is an exploded view of a first drive mechanism of the drain cleaner according to one embodiment.

FIG. 16 illustrates one embodiment of a first drive mechanism 100. The illustrated first drive mechanism 100 includes a spindle 108 and a collar 112. The spindle 108 includes a first end 116, which is received by the drum 32, and a second end 120, which engages with the power tool. In the illustrated embodiment, the first end 116 is a male end, which is inserted into a bore 124 formed in the second housing 40 of the drum 32. The first end 116 of the spindle 108 has a generally cylindrical shape, with at least one keyed feature to rotationally fix the first drive mechanism 100 relative to the drum 32. For example, in the illustrated embodiment, the first end 116 of the spindle 108 includes a plurality of flat edges 128 that correspond with flat sides 132 of the bore 124 of the drum 32. The flat edges 128 of the spindle 108 prevent the spindle 108 from spinning within the bore 124 and enable the rotational force from the power tool to be transmitted through the first drive mechanism 100 to the drum 32.

In the illustrated embodiment, the second end 120 of the spindle 108 is a female end, which is configured to receive a drive member of the power tool. Specifically, the power tool may include a rotatable drive member (e.g., a hex-shaped shaft), which may be inserted into the spindle 108 to transmit the rotational force of the power tool to the drum 32. Similar to the first end 116 of the spindle 108, the second end 120 of the spindle 108 also includes at least one keyed feature to rotationally fix the second drive mechanism 104 to the drive member of the power tool. For example, in the illustrated embodiment, the second end 120 of the spindle 108 has a hex shaped bore 136, which may receive the drive member of the power tool.

Additionally, the collar 112 of the first drive mechanism 100 may be used to releasably couple the power tool to the first drive mechanism 100. More specifically, the collar 112 extends circumferentially around the second end 120 of the spindle 108 and is axially slidable relative to the spindle 108. Sliding the collar 112 axially back and forth along the spindle 108 may engage and release detent balls (not shown), which help secure the drive member of the power tool within the second end 120 of the spindle 108.

Figure 17:
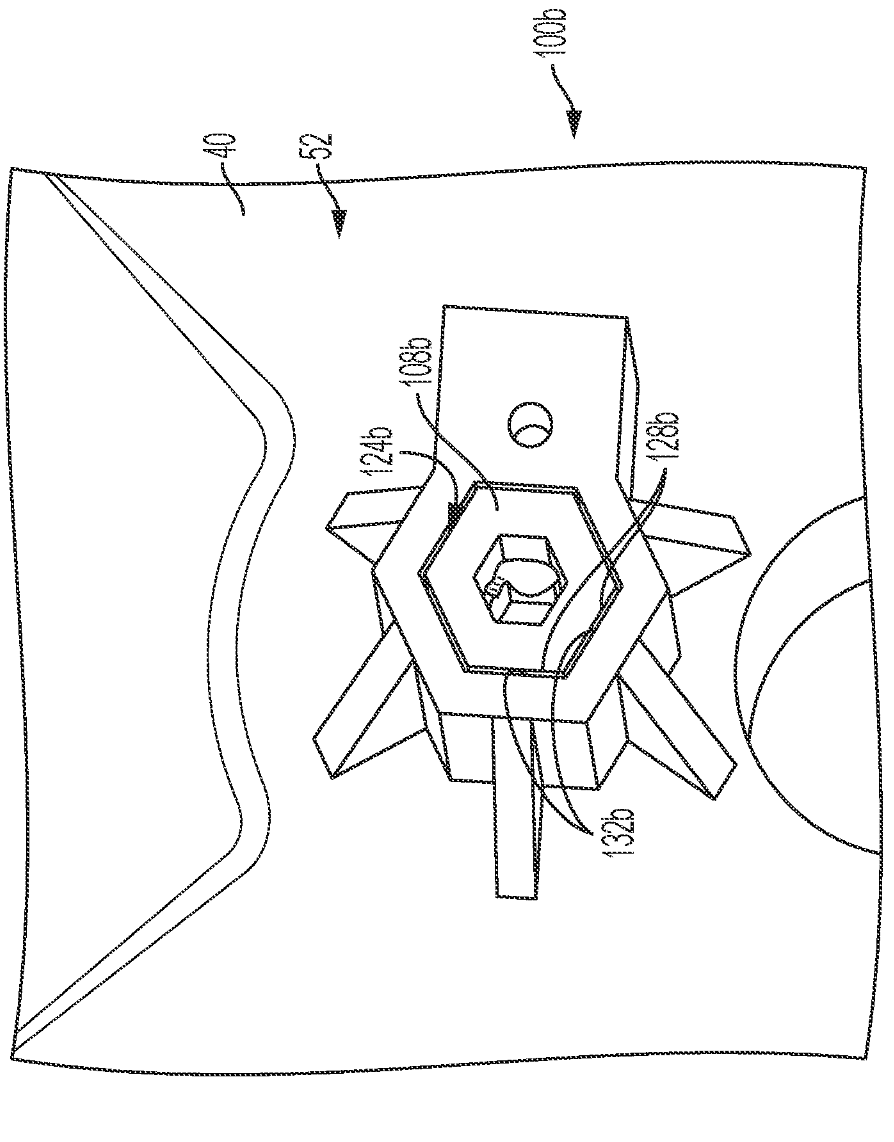
FIG. 17 is detailed view of a first drive mechanism of the drain cleaner according to another embodiment.

FIG. 17 provides a second embodiment of a first drive mechanism 100*b*. The illustrated first drive mechanism 100*b* includes a spindle 108*b*, which is inserted into the bore 124*b* formed in the second housing 40 of the drum 32. The spindle 108*b* includes a plurality of keyed features to rotationally fix the drive mechanism 100 relative to the drum 32. For example, in the illustrated embodiment, the spindle 108*b* includes a plurality of flat edges 128*b* that correspond with flat sides 132*b* of the bore 124*b*. The keyed features enable the rotational force from the power tool to be transmitted through the first drive mechanism 100*b* to the drum 32. In some embodiments, the first drive mechanism 100*b* may be formed by molding the spindle 108*b* into the second housing 40 of the drum 32.

Figure 18:
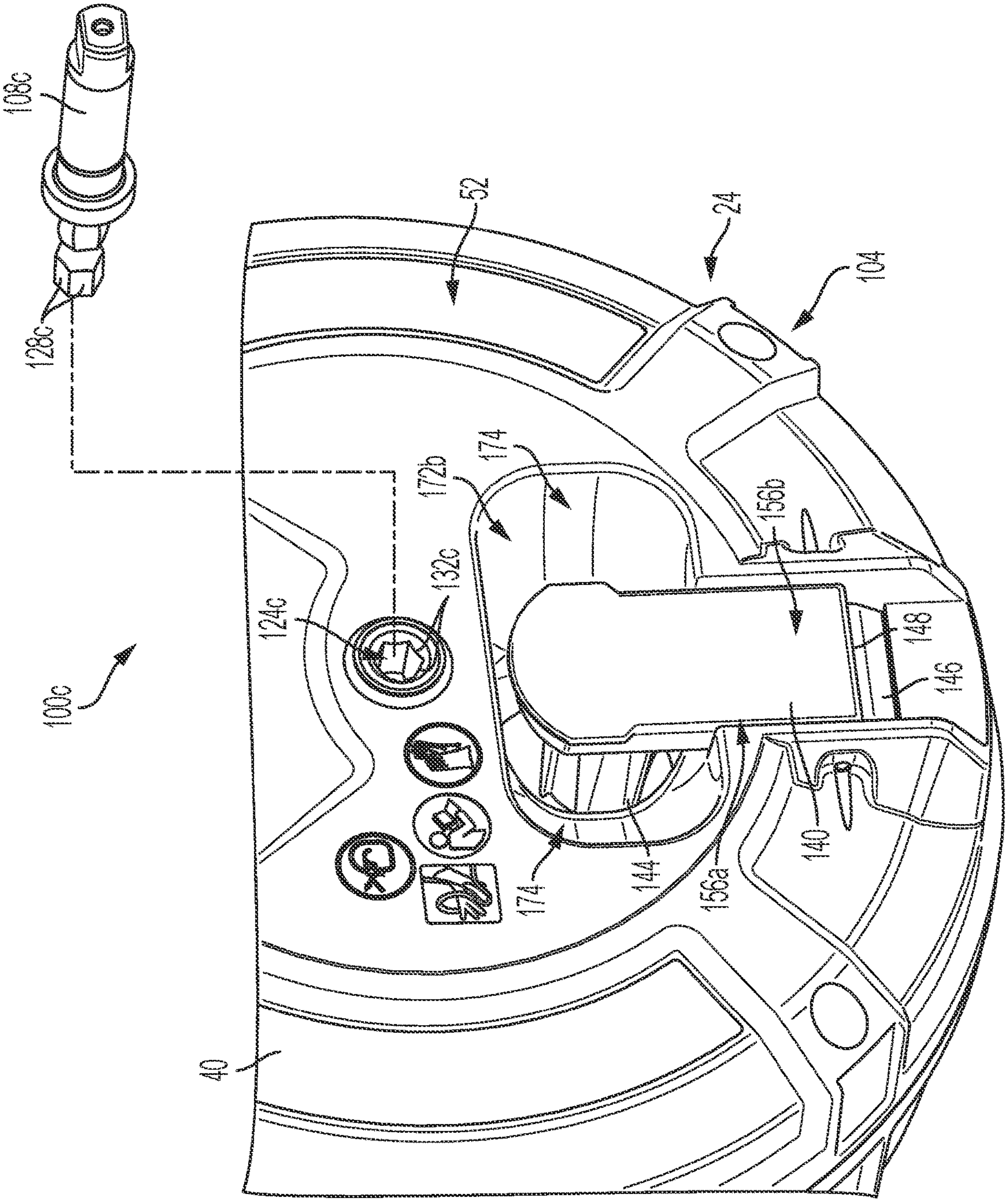
FIG. 18 is detailed view of a first drive mechanism of the drain cleaner according to another embodiment.

FIG. 18 provides a third embodiment of a first drive mechanism 100*c*, which is similar to the second embodiment of a first drive mechanism 100*b*. The illustrated first drive mechanism 100*c* includes a spindle 108*c*, which is inserted into the bore 124*c* formed in the second housing 40 of the drum 32. The spindle 108*c* includes a plurality of keyed features, such as a plurality of flat edges 128*c* that correspond with flat sides 132*c* of the bore 124*c*. The keyed features enable the rotational force from the power tool to be transmitted through the first drive mechanism 100*c* to the drum 32. One aspect of the first drive mechanism 100*c* that differs from the first drive mechanism 100*b* is that the first drive mechanism 100*c* is flush mounted with the back of the drum 32. Flush mounting the first drive mechanism 100*c* helps to reduce the number of features protruding from the back of the drum 32 that could potentially hit a user while the drum 32 is rotating. Additionally, the embodiment shown in FIG. 18 includes a larger recess 172*b* for receiving the handle 144. This recess 172*b* extends a distance beyond the crank arm 140 and handle 144 (e.g., left and right) to provide inlets 174 for a user to reach a finger into the recess 172*b* and pivot the second drive mechanism 104*b* from the stowed position to the operation position. Additionally, the spindle 108*b* may include at least one keyed feature to rotatably fix the spindle 108*b* to the drive member of the power tool. For example, the illustrated spindle 108*b* includes a hex shaped portion.

Once the power tool is coupled to the first drive mechanism 100, the rotational force generated by the power tool may be transmitted to the drum 32 via the first drive mechanism 100. However, when the drain cleaner 20 is not operatively coupled to the power tool, a second drive mechanism 104 may be used to manually rotate the drum 32, and thereby, the cable 44. This second drive mechanism 104 may be the primary rotation mechanism of the drum 32 or may be a secondary (i.e., back up) rotation mechanism used in conjunction with a drive motor (e.g., the power tool motor).

Second Drive Mechanism

Figure 19:
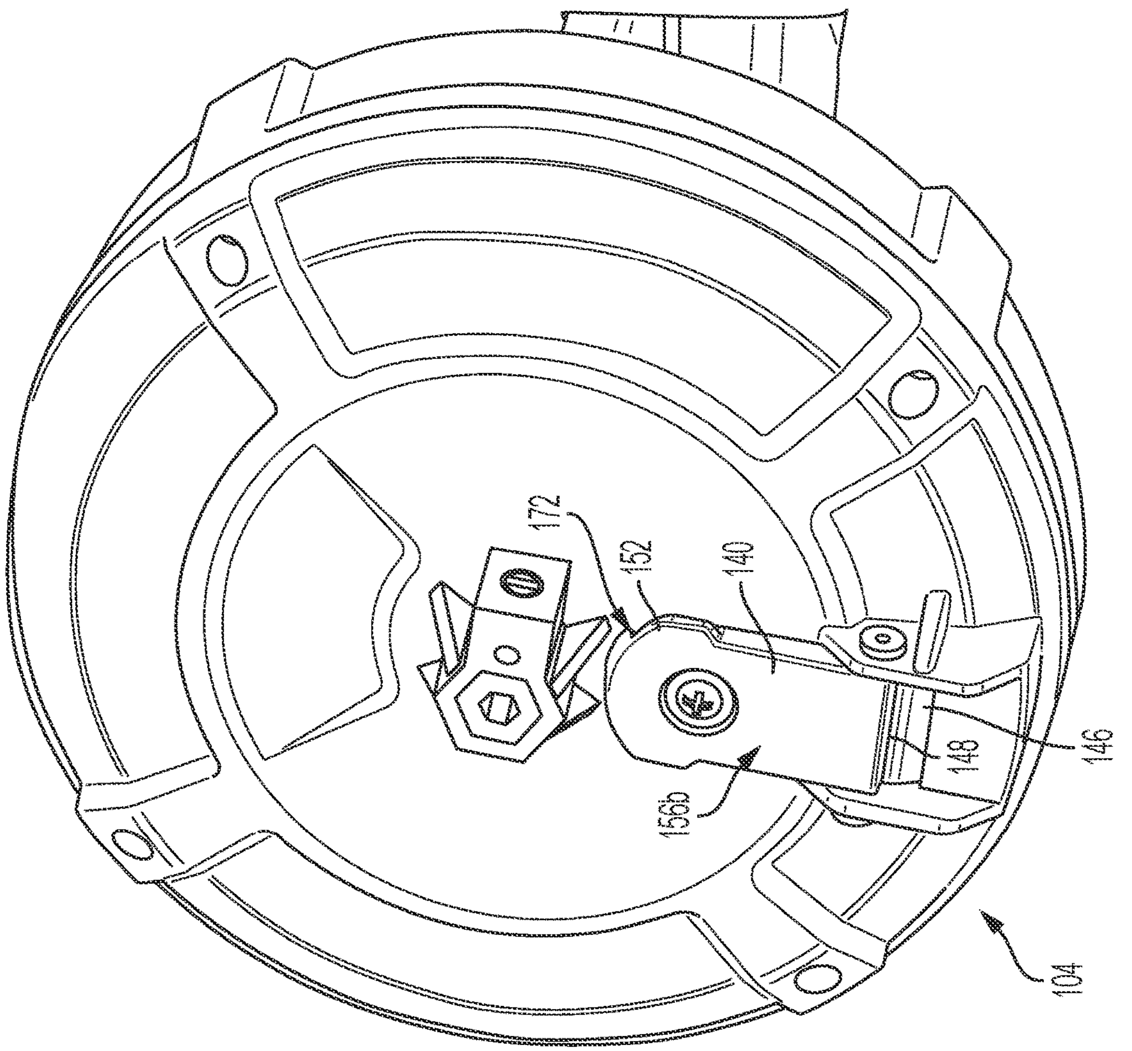
FIG. 19 is a detailed view of a portion of the drain cleaner including the first drive mechanism and a second drive mechanism according to one embodiment, where the second drive mechanism is in a stowed position.
Figure 20:
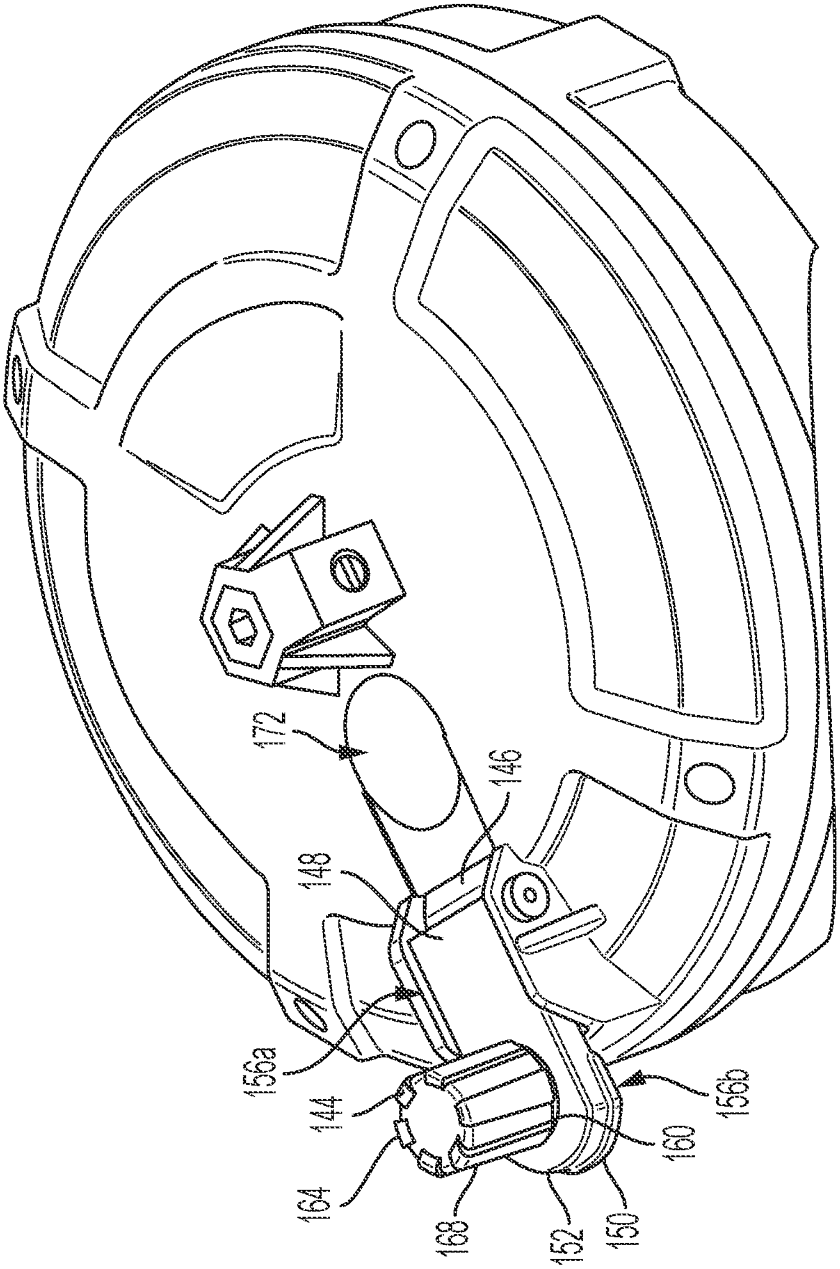
FIG. 20 is a detailed view of the portion of the drain cleaner including the first drive mechanism and the second drive mechanism according to one embodiment, where the second drive mechanism is in an operation position.

Referring to FIGS. 18-20, the illustrated second drive mechanism 104 includes a manual crank, which may be rotated about the axis 60 by an operator to rotate the drum 32. The second drive mechanism 104 is positioned on the rear wall 52 of the drum 32 at an off-center location. In other words, the second drive mechanism 104 is positioned away from the axis 60 of rotation of the drum 32. Furthermore, the illustrated drive mechanism 104 is adjustable between a stowed position and an operational position. For example, when the first drive mechanism 100 is in use, the second drive mechanism 104 may be in the stowed position so that the second drive mechanism 104 does not interfere with the operation of the drain cleaner 20. In the embodiment illustrated in FIG. 18, the first drive mechanism 100 is flush mounted with the back of the drum 32 to help avoid interference with the operator. However, when the operator chooses to use the second drive mechanism 104, the second drive mechanism 104 may be adjusted to an operational position, which enables rotation of the drum 32 by the second drive mechanism 104.

In the illustrated embodiment, the second drive mechanism 104 includes a crank arm 140, a handle 144, and a biasing member 146. The crank arm 140 is coupled to the drum 32 while the handle 144 extends from the crank arm 140 to provide a grip for the operator. More specifically, the crank arm 140 includes a first end 148, which is pivotably coupled to the drum 32, and a second end 152 supporting the handle 144. The illustrated crank arm 140 has a rectangular or plate-like shape defined by two opposing side walls 156 and a slim profile. However, in other embodiments, the crank arm 140 may have a different size and shape. The illustrated crank arm 140 also includes a lip 150 extending around at least a portion of the crank arm 140 to provide a gripping portion for an operator adjust the second drive mechanism 104 between the stowed position and the operational position.

Figure 21:
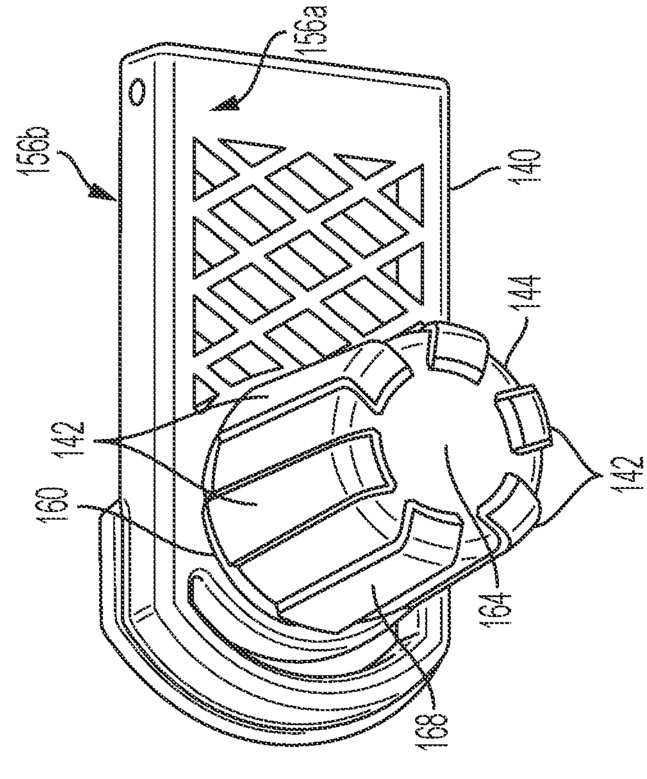
FIG. 21 is a detailed view of a crank arm according to one embodiment.

FIG. 21 provides a detailed view of one embodiment of a crank arm 140 and a handle 144. The handle 144 extends from and generally perpendicular to the first side wall 156*a* of the crank arm 140. The illustrated handle 144 has a cylindrical shape with a first end 160, a second end 164, and an annular wall 168 extending between the first end 160 and the second end 164. Additionally, the handle 144 includes a plurality of ribs 142 extending between the first end 160 and the second end 164 to provide a gripping surface for a user. The ribs 142 allow a user to grip the handle 144 with the tips of their fingers. In the illustrated embodiment, the handle 144 has a generally cylindrical shape with the ribs 142 extending around the circumference of the handle 144. However, in other embodiments, the handle 144 may have a different shapes and configurations that are suitable to provide a grip for the operator.

Figure 22:
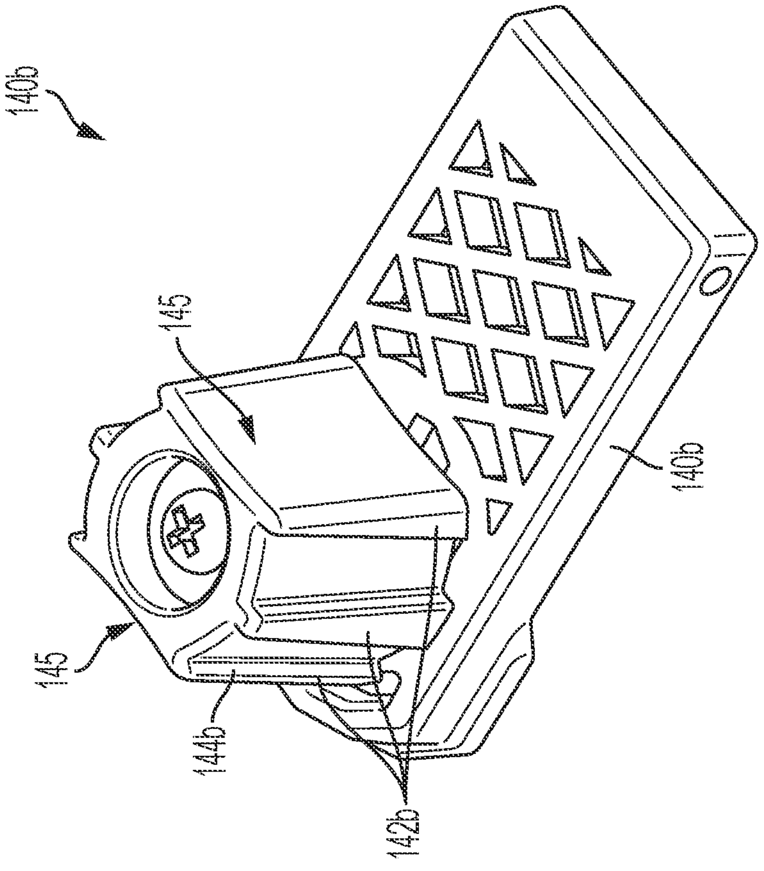
FIG. 22 is a detailed view of a crank arm according to another embodiment.

FIG. 22 provides a detailed view of another embodiment of a crank arm 140*b*. In this Embodiment, the handle 144*b* is not cylindrical, but rather has two opposing flat surfaces

145 to provide for ergonomic gripping. The flat surfaces 145 enable a user to grip the handle **144*b* in a similar manner as a fishing reel. Specifically, the handle 144*b* may be held with a side of an index finger on one of the flat surfaces 145 and a thumb on the other of the flat surfaces 145. The handle 144*b* is rotatably coupled to the crank arm 140*b* so that the handle 144*b* may be maintained in a certain orientation as gripped by the user while the crank arm 140*b* and the drum 32 rotate. In other words, as an operator rotates the second drive mechanism 104*b*, the handle 144*b* rotates relative to the crank arm 140*b* so that the operator is not required to either re-grip the handle 144*b* or twist his or her wrist as the drum 32 rotates about the axis 60. The embodiment of a handle 144*b* shown in FIG. 22 may also include ribs 142*b* along either the flat surfaces 145 or the sides of the handle 144*b***.

With continued reference to FIGS. 19 and 20, the second drive mechanism 104 may be stowed away when not in use. Specifically, the second drive mechanism 104 is supported on the drum 32 and is adjustable between a stowed position (FIG. 19), in which at least a portion of the second drive mechanism 104 is hidden, and an operational position (FIG. 20), in which the second drive mechanism 104 may be used by an operator to manually rotate the drum 32. In the illustrated embodiment, the second drive mechanism 104 is rotatable between the stowed position and the operational position. However, in other embodiments, the second drive mechanism 104 may be adjustable between positions by other means, such as sliding or toggling between the stowed position and the operational position.

The biasing member 146 of the second drive mechanism 104 assists in maintaining the second drive mechanism 104 in either the stowed position or the operational position. In the illustrated embodiment, the biasing member 146 is a leaf spring which maintains the second drive mechanism 104 in either the stowed position of the operational position. The biasing member 146 helps toggle the second drive mechanism 104 between the stowed position and the operational position by "snapping" or "springing" towards the stowed position or the operational position. For example, the operator may exert a force on the crank arm 140 to overcome the spring force of the biasing member 146 in a first direction and move the second drive mechanism 104 out of the stowed position. Likewise, the operator may exert a force on the crank arm 140 to overcome the spring force of the biasing member 146 in a second direction to move the second drive mechanism 104 back into the stowed position. In some embodiments, the second drive mechanism 104 includes a middle position where it may be stopped between the fully stowed position and the operational position.

As shown in FIG. 19, when the second drive mechanism 104 is in the stowed position, the handle 144 is received within a recess 172 formed on the rear wall 52 of the drum 32. Furthermore, the crank arm 140 extends radially inward to cover or at least partially conceal the recess 172. For example, when in the stowed position, the first side wall **156*a* of the crank arm 140 faces the rear wall 52 of the drum 32, and the second side wall 156*b* is exposed to the exterior of the drum 32**.

When pivoted to the operational position, as shown in FIG. 20, the handle 144 is removed from the recess 172 and is accessible to an operator. The crank arm 140 extends radially outward to position the handle 144 farther away from the axis 60 than when in the stowed position. In the illustrated embodiment, the crank arm 140 and handle 144 extend beyond the circumference of the annular wall 56. However, in other embodiments, the handle 144 may be positioned within the bounds of the drum 32. Additionally, when in the operational position, the crank arm 140 is pivoted so that the second side wall **156*b* faces towards the rear wall 52 of the drum 32 and first side wall 156*a* faces the exterior of the drum 32. The illustrated handle 144 extends rearward of the drum 32 and may be rotated about the axis 60 to thereby rotate the drum 32**.

As previously mentioned, rotation of the drum 32 may be used to feed the cable 44 into a drain as well as to spin the cable 44 within the drain to help dislodge debris. In the embodiment disclosed herein the drain cleaner 20 includes the autofeed mechanism 176, which works in conjunction with the rotation of the drum 32 to selectively feed (i.e., extend or retract) the cable 44 into or out of a drain. In other words, the autofeed mechanism 176 may control the linear movement of the cable 44 along the cable axis 60. Some drain cleaners 20 may require an operator to manually extend the cable 44 into a drain. In those cases, an operator may pull the cable 44 from the drum 32 and direct it into a drain. However, in other embodiments, the drain cleaner 20 may include an autofeed mechanism 176, which may automatically feed the cable 44 into a drain. Additionally, in some embodiments, the autofeed mechanism 176 may be used to both extend the cable 44 into a drain as well as to retract the cable 44 from the drain. In other embodiments, the autofeed mechanism 176 may only be capable of feeding the cable 44 in one direction.

Autofeed Mechanism

Referring to FIGS. 23-27, the illustrated autofeed mechanism 176 is integrated within the nose assembly 28 of the drain cleaner 20 and may be actuated by squeezing the nose assembly 28 of the drain cleaner 20 to activate the autofeed mechanism 176. The illustrated autofeed mechanism 176 includes a plurality of rollers 180 (or bearings) and an actuating member 184. The illustrated embodiment includes three rollers 180, which are arranged circumferentially about the cable 44. In particular, a first roller **180*a* is supported on the handle 30 of the nose assembly 28, and second and third rollers 180*b*, 180*c* are supported on an actuating member 184. The first roller 180*a* remains stationary relative to the cable axis 60. On the other hand, the second and third rollers 180*b*, 180*c* are radially movable towards and away from the cable axis 60. The second and third rollers 180*b*, 180*c* are selectively engageable with the cable 44 to feed the cable 44 into or out of the drain. More specifically, the second and third rollers 180*b*, 180*c* may be moved radially inward to engage the cable 44 and squeeze the cable 44 between all three rollers 180. When the cable 44 is simultaneously engaged by the rollers 180 and rotated by the drum 32, the rollers 180 will frictionally engage the cable 44 and cause the cable 44 to move in a linear direction along the cable axis 60. In other embodiments, the first roller 180*a* may be supported on the actuating member 184, and the second and third rollers 180*b*, 180*c* may be supported on the body 64**.

The cable 44 may move in a first linear direction to extend the cable 44 into the drain and may move in a second linear direction to retract the cable 44 out of the drain and back into the drum 32. The linear direction of the cable 44 depends upon the rotational direction of the drum 32 and cable 44. The rollers 180 are arranged at an angle relative to the cable axis 60 so that the rollers 180 engage the winding of the wire cable 44. Accordingly, rotation of the cable 44 in a first rotational direction (e.g., clockwise) may move the cable 44 along the cable axis 60 in the first linear direction, while rotation of the cable 44 in a second rotational direction (e.g., counter clockwise) may move the cable 44 along the cable axis 60 in the second linear direction. The rotational direction of the cable 44 may be determined by the rotational direction of the drum 32.

Figure 25:
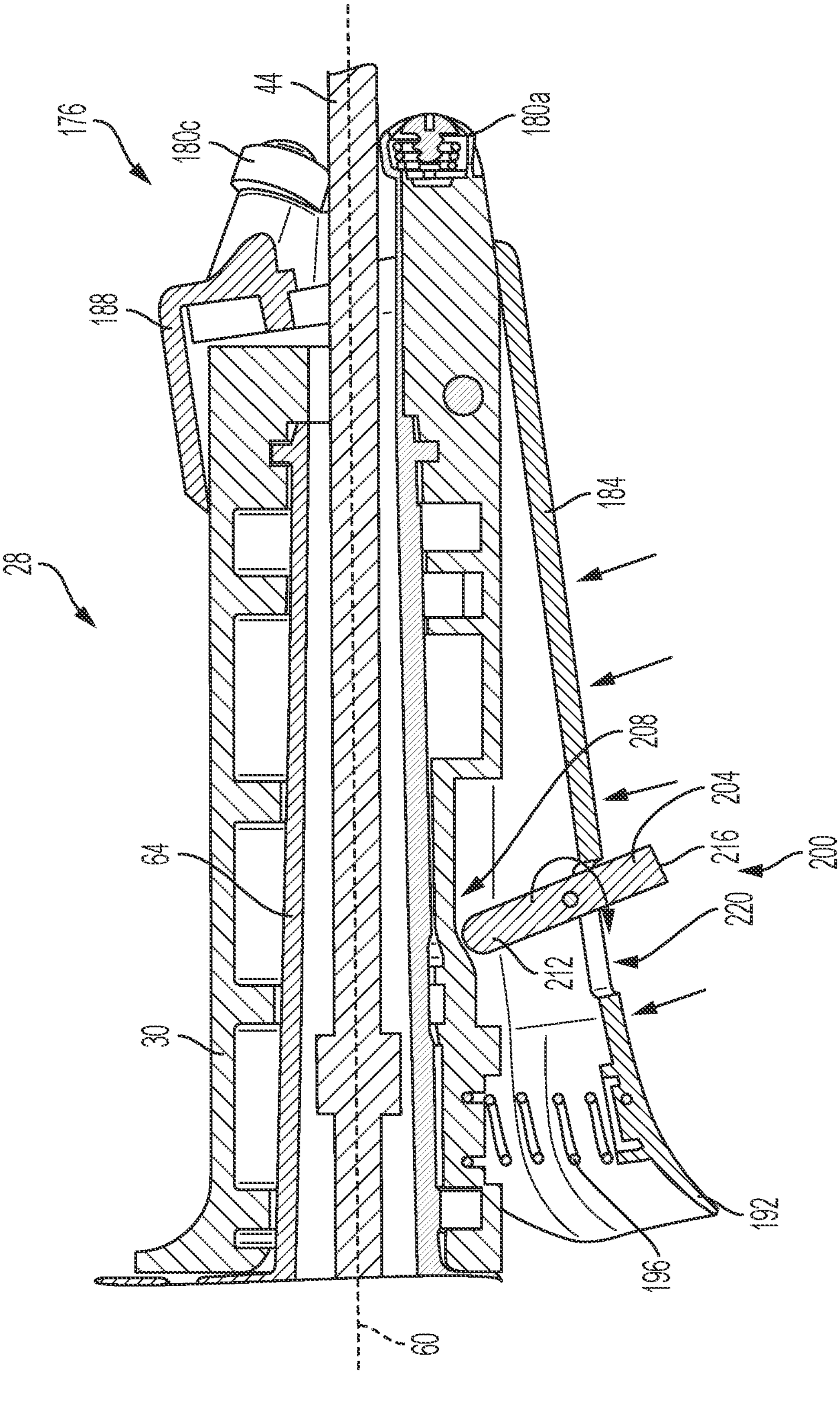
FIG. 25 is a detailed view of an autofeed mechanism in a disengaged position and a feedlock in a locked position according to one embodiment.
Figure 26:
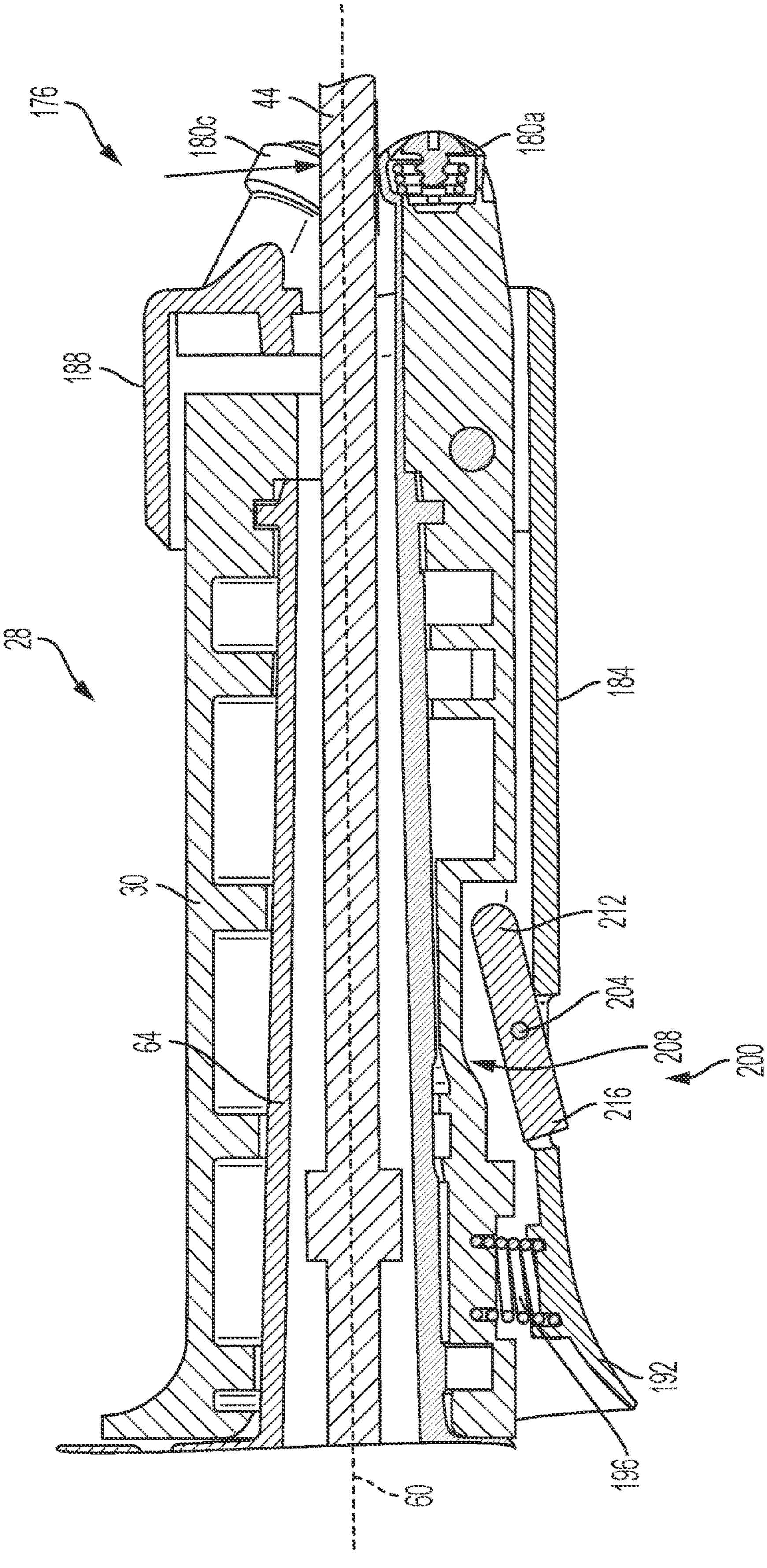
FIG. 26 is a detailed view of the autofeed mechanism in an engaged position and the feedlock in a released position.

The autofeed mechanism 176 may be operated by squeezing the nose assembly 28 of the drain cleaner 20 to actuate the actuating member 184. In the illustrated embodiment, the actuating member 184 includes a base portion 188, which supports the second and third rollers 180*b*, 180*c*, and a trigger portion 192, which may be actuated by an operator to operate the autofeed mechanism 176. More specifically, the actuating member 184 is pivotably coupled to the handle 30 of the nose assembly 28 of the drain cleaner 20. Pivoting the actuating member 184 (e.g., clockwise as shown in FIGS. 25-26) moves the second and third rollers 180*b*, 180*c* towards the first roller 180*a* to squeeze the cable 44 between the three rollers 180. The trigger portion 192 of the actuating member 184 extends alongside the handle 30 of the nose assembly 28 and may be squeezed towards the handle 30 by an operator's hand in order to pivot the actuating member 184. The trigger portion 192 may be a pallet style trigger or a lever style trigger. However, in other embodiments, the trigger portion 192 may be different styles of triggers capable of activating the autofeed mechanism 176.

The actuating member 184 is biased towards a disengaged position by a biasing member 196, or a spring. Accordingly, a user must squeeze the trigger portion 192 against the biasing force to engage the autofeed mechanism 176. In other embodiments, the biasing member 196 may be omitted, and the actuating member 184 may be biased toward the disengaged position by gravity. Alternatively, in some embodiments, the trigger portion 192 is biased towards a disengaged position by a torsion spring 196 (or a double torsion spring). FIG. 25 illustrates the autofeed mechanism 176 in a disengaged position where the actuating member 184 is biased away from the handle 30 of the nose assembly 28, and the rollers 180 are pivoted away from the cable 44. FIG. 26 illustrates the autofeed mechanism 176 in an actuated position where the actuating member 184 is pivoted towards the handle 30 of the nose assembly 28 and the rollers 180 are pivoted into engagement with the cable 44.

Figure 23:
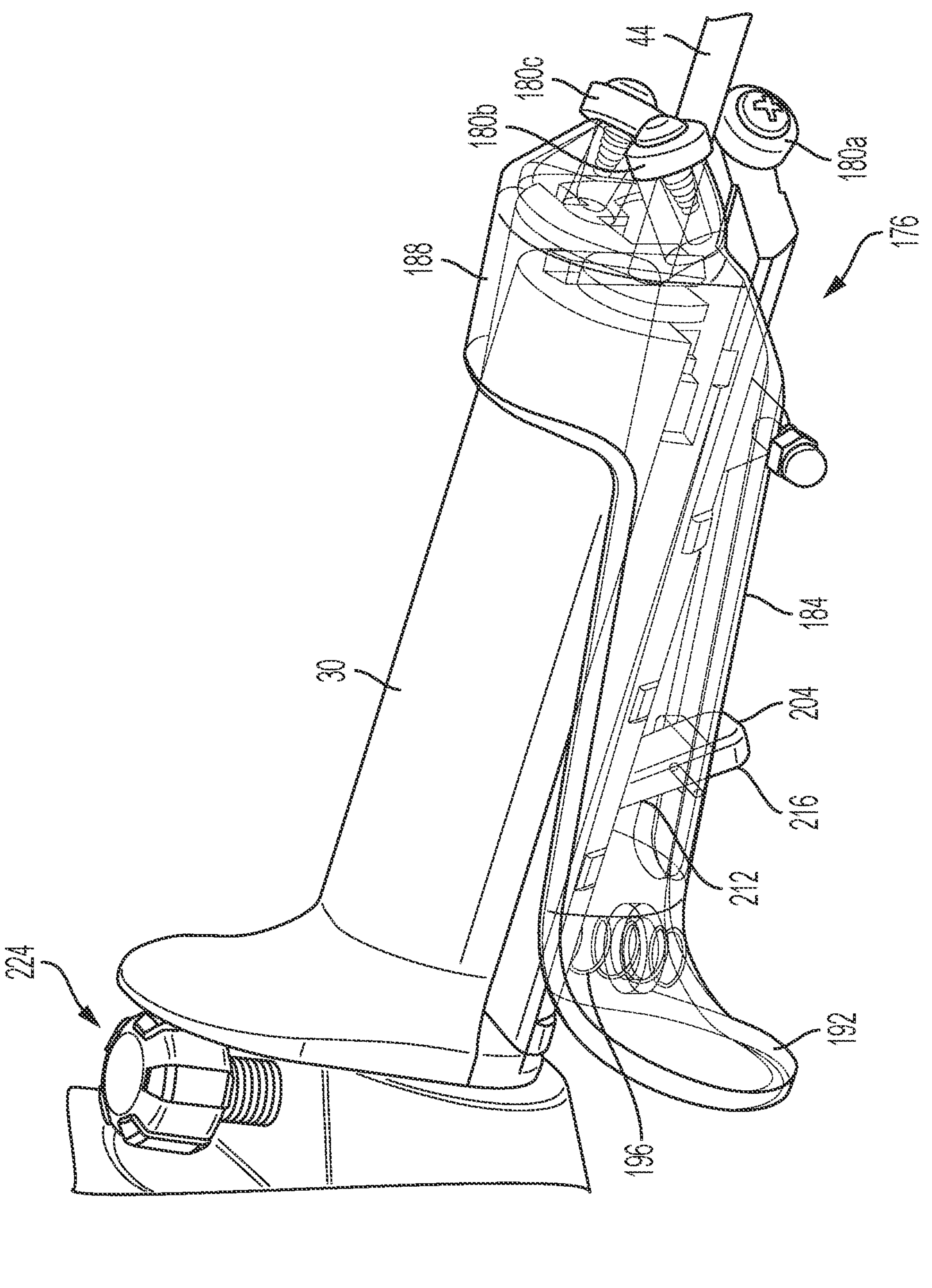
FIG. 23 is a detailed view of a nose assembly of a drain cleaner with portions of the nose assembly shown transparently.
Figure 24:
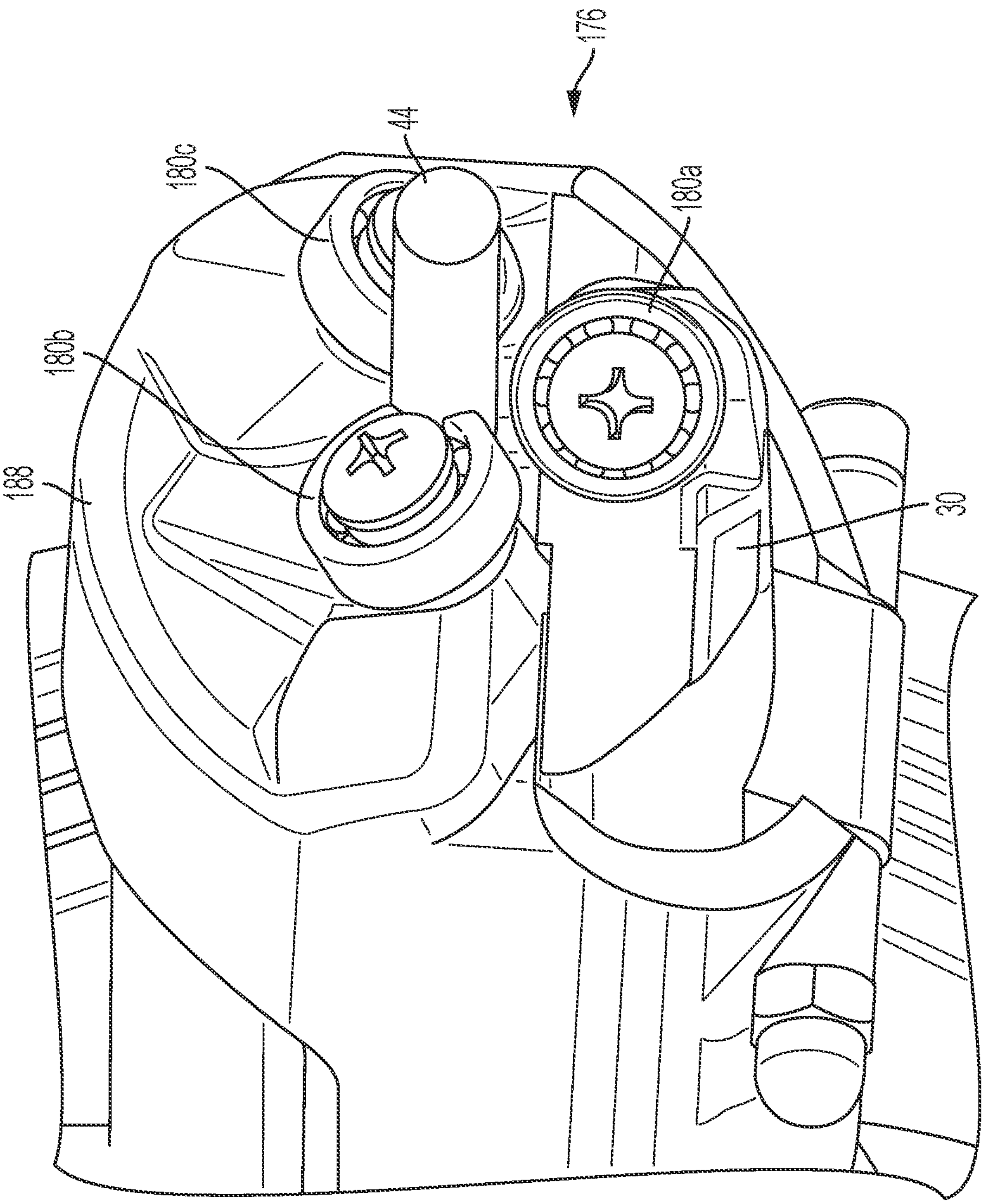
FIG. 24 is a detailed view of a portion of the nose assembly of FIG. 23.

The illustrated autofeed mechanism 176 further includes an autofeed lock 200, which inhibits unintentional actuation of the autofeed mechanism 176. Referring to FIGS. 23 and 25-26, the autofeed lock 200 includes a locking member 204, which inhibits the actuating member 184 from being pivoted towards the handle 30 of the nose assembly 28 until the autofeed lock 200 is released. In the illustrated embodiment, the locking member 204 is rotatably coupled to the trigger portion 192 of the actuating member 184. The locking member 204 includes a first end 212 extending within the handle 30 of the nose assembly 28, and a second end 216 which extends outside of the handle 30 of the nose assembly 28. As shown in FIGS. 23 and 25, the second end of the locking member 204 may extend through an opening 220 in the trigger portion 192 such that it is accessible by an operator to disengage the autofeed lock 200.

Figure 27:
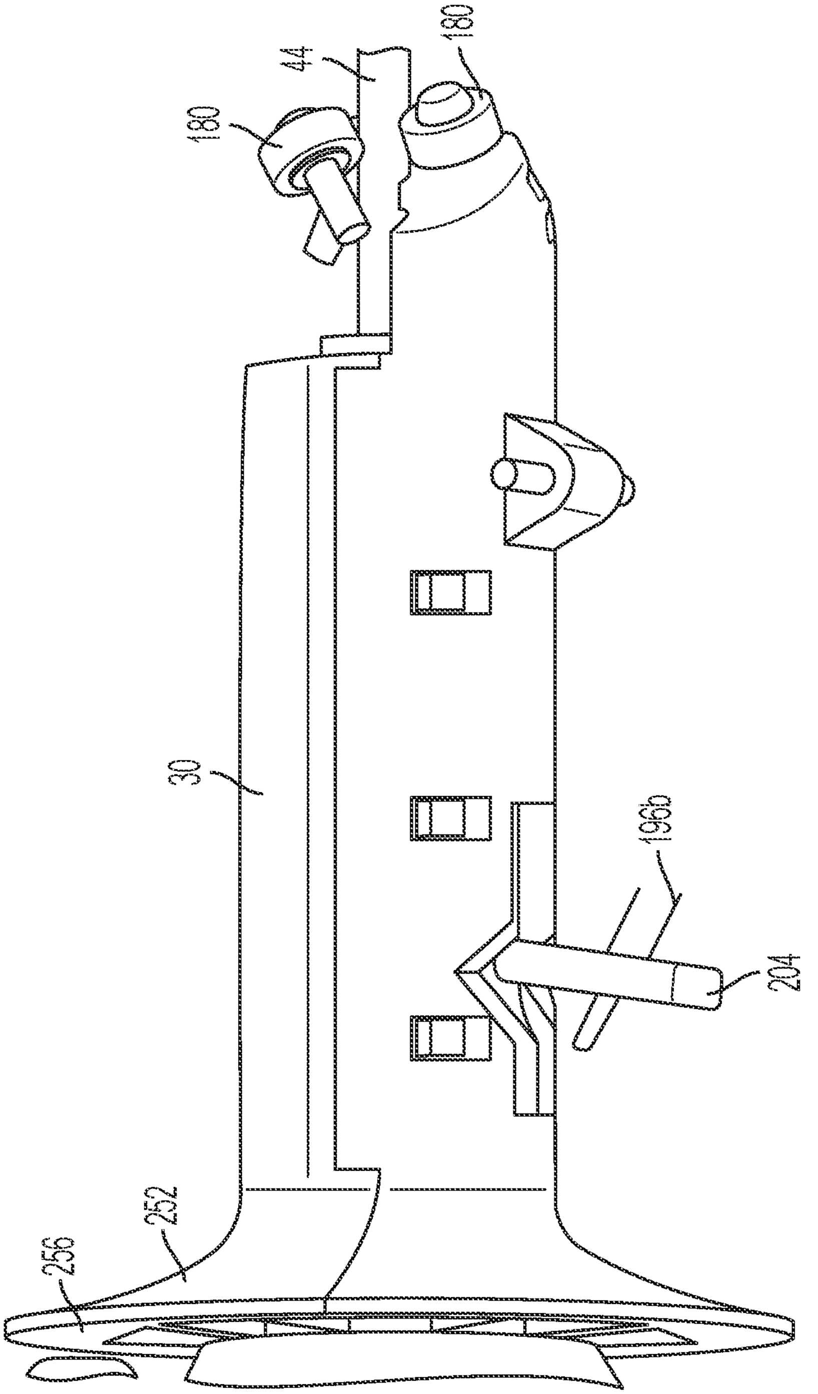
FIG. 27 is a detailed view of a nose assembly with portions removed.

FIGS. 25 and 26 illustrate the autofeed lock 200 in a locked position and a released position, respectively. When in a locked position, as shown in FIG. 25, the locking member 204 extends radially inward and engages with an inner locking surface 208 of the body 64 of the nose assembly 28. Engagement with the inner locking surface 208 inhibits the trigger portion 192 from being squeezed towards the body 64 of the nose assembly 28. However, as shown in FIG. 26, an operator may rotate the locking member 204 so that a first end 212 of the locking member 204 is disengaged from the inner locking surface 208. Specifically, the operator may rotate the locking member 204 by pulling the second end 216 of the locking member 204 rearward such that it rotates counter-clockwise. When this occurs, the autofeed lock 200 is released and an operator is free to operate the autofeed mechanism 176. In some embodiments, the locking member 204 is biased towards a locked position by a torsion spring 196*b* (FIG. 27). Furthermore, in some embodiments, the torsion spring 196*b* may be the biasing element that also biases the trigger portion 192 towards the unlocked position, and the biasing member 196 may be omitted. FIG. 27 provides an exemplary embodiment of a locking member 204 and trigger portion 192, which utilizes a double torsion spring 196*b*.

Cable Lock & Guard

In addition to the autofeed lock 200, the drain cleaner 20, 1020 may further include a cable lock and guard assembly. While the autofeed lock 200 inhibits actuation of the autofeed mechanism 176, the cable lock 224 helps maintain the extension of the cable 44 at a desired length. Referring to FIGS. 28-31, the cable lock 224 restricts linear movement of the cable 44 so that the cable 44 may not be fed automatically or manually into the drain cleaner 20. One of the purposes of the cable lock 224 is to restrict unwanted extension or unwinding of the cable 44. For example, at times the cable 44 may become stuck within the drain and an operator may have to pull on the cable 44 in order to dislodge the cable 44 from the drain. While it is possible for an operator to grasp the cable 44 directly and pull on the cable 44 until it may be removed, the cable 44 is often undesirable to touch. For example, the cable 44 may be wet or may be covered in debris captured from within the drain. Accordingly, it may be preferable to hold the drain cleaner body 64 rather than the cable 44 when pulling the cable 44 out of the drain. However, if the cable 44 is really stuck within the drain, pulling on the body 64 of the drain cleaner 20 may simply cause the cable 44 to unwind from the drum 32 rather than dislodging from the drain. The cable lock 224 may resolve this unwanted unwinding of the cable 44 from the drum 32. Similarly, when an operator finds a clog and wants to manually break up the clog, the operator may set the cable lock 224 and manually rotate or wiggle the cable 44 around within the drain to break up the clog without accidentally engaging the autofeed mechanism 176. In some embodiments, the cable lock 224 may set the cable 44 at a location of a clog and allow a user to move (i.e., jam) the cable 44 back and forth in and out of the pipe to dislodge the clog. This linear movement of the cable 44 may also be accompanied by rotational movement of the cable 44 when also locked with the cable 44 locked.

Typical cable locks tend to be either part of a cable feed mechanism or at least located on the nose assembly of the drain cleaner near the cable feed mechanism. One problem with the nose assembly mounted cable locks is that they may rotate very quickly and with significant inertia. Unfortunately, the rotating cable lock may then become a rotating cutter capable of injuring an operator. On the other hand, the illustrated cable lock 224 is disposed between the drum 32 and the nose assembly 28. By positioning the cable lock 224 between the drum 32 and the nose assembly 28, the cable lock 224 is less likely to create a hazard for the user.

Figure 28:
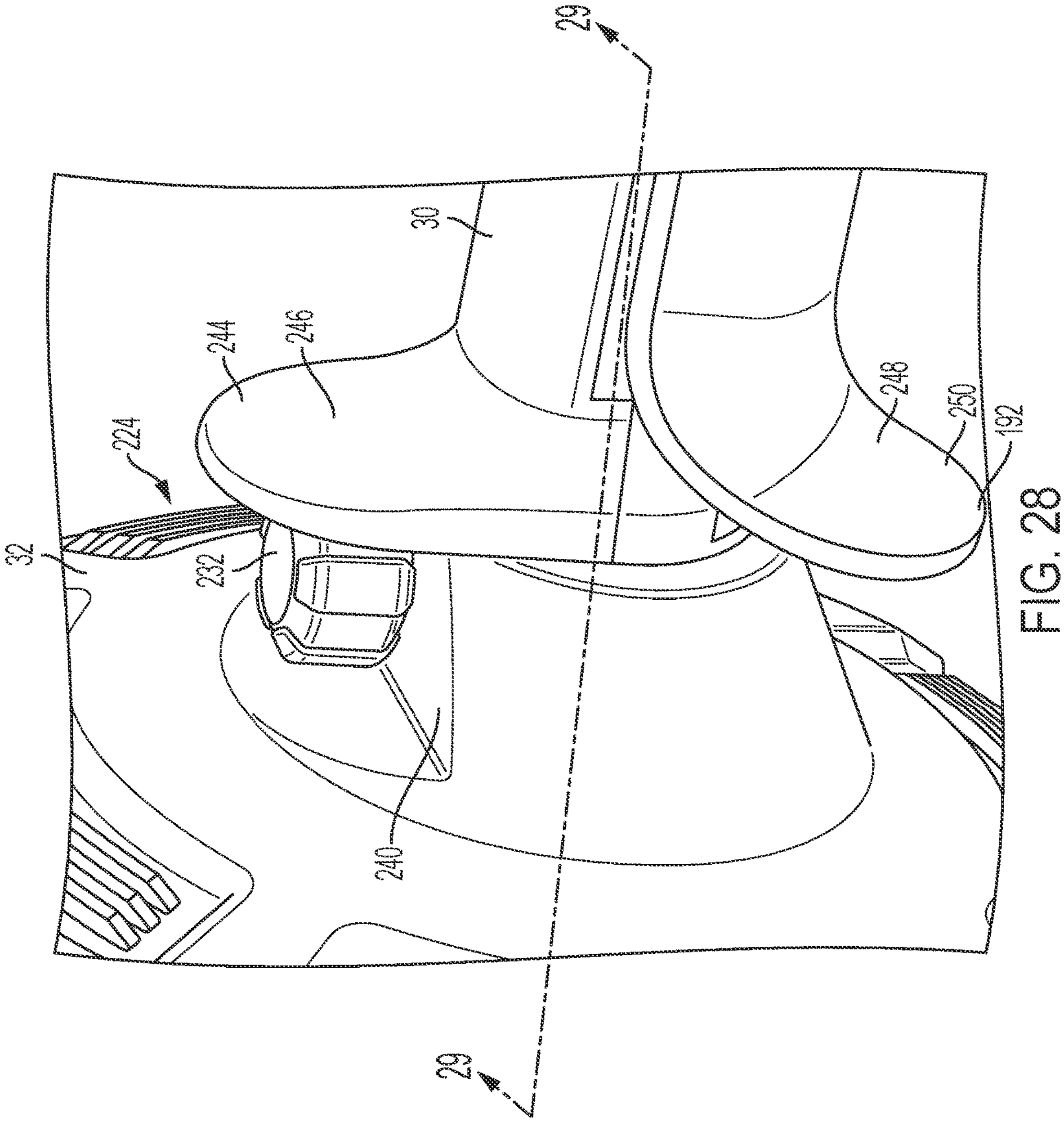
FIG. 28 is a detailed view of a cable lock according to one embodiment.
Figure 29:
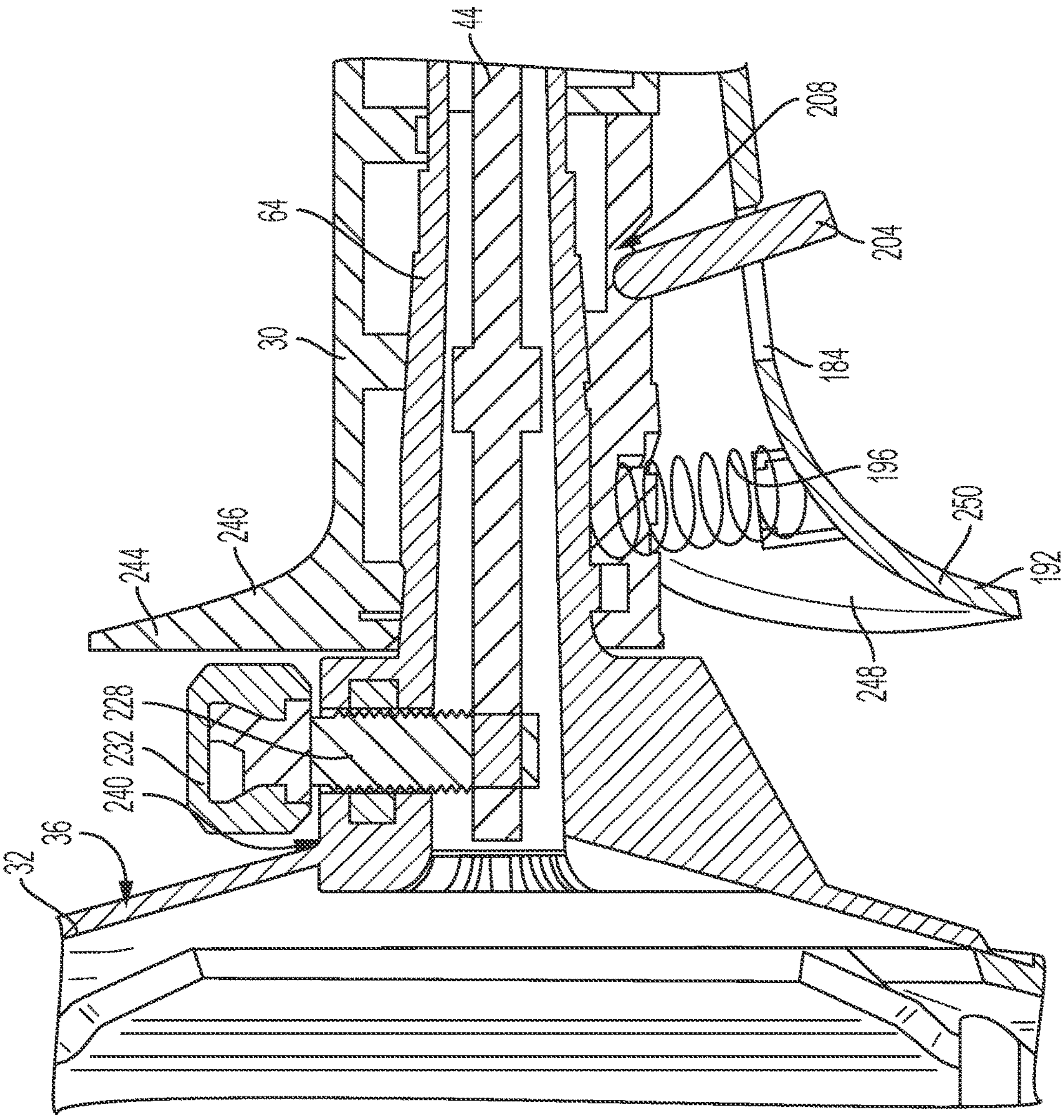
FIG. 29 is a cross-sectional view of the cable lock taken along section line 29-29 of FIG. 28.
Figure 30:
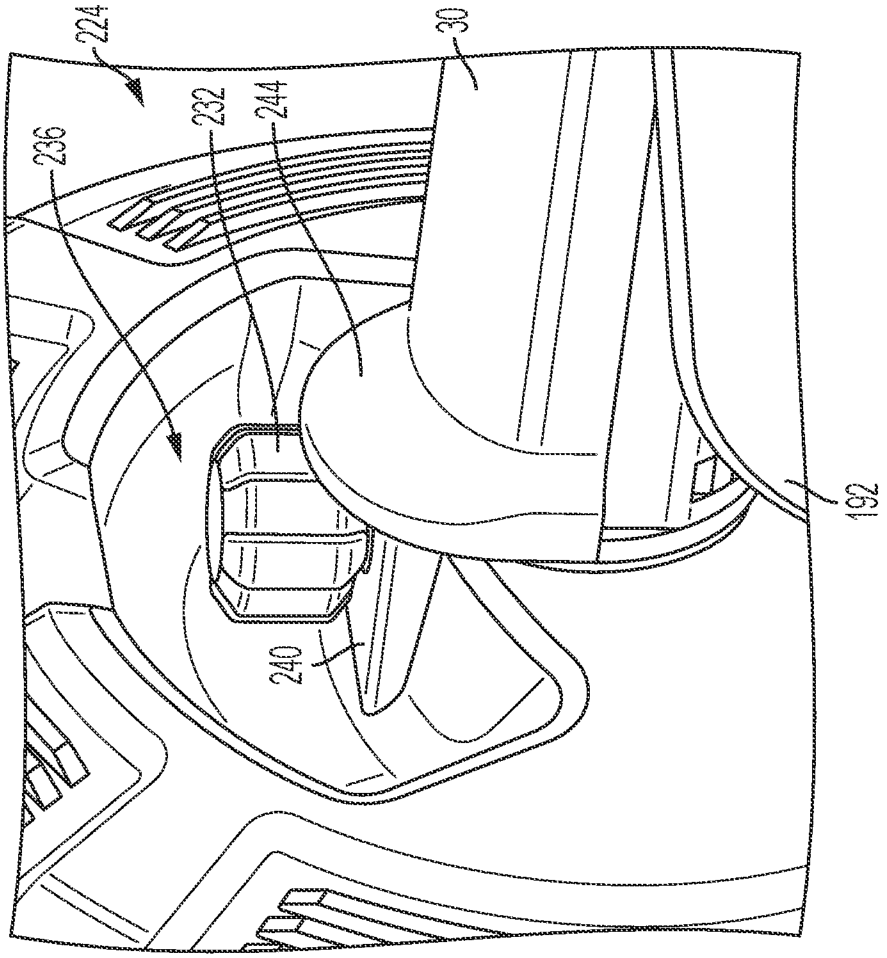
FIG. 30 is a detailed view of a cable lock according to another embodiment.

With continued reference to FIGS. 28-31, the illustrated cable lock 224 is positioned adjacent the front wall 48 of the drum 32 proximate the nose assembly 28. Specifically, the cable lock 224 is positioned on the rear end of the nose assembly 28 closest to the drum 32 (i.e., opposite the rollers). In the embodiment illustrated in FIG. 30, the cable lock 224 is set back within the cavity 236 in a manner where it may still be accessed by an operator when necessary. For example, the cable lock 224 may be positioned in a cavity formed by the wall 48 of the drum 32. However, as shown in FIGS. 28-29, in some embodiments the cable lock 224 may be positioned between the drum 32 and the nose assembly 28 without being set into a cavity 236.

Referring to FIGS. 28-31, in the illustrated embodiment, the cable lock 224 is a thumb screw 224 including a threaded shaft 228 and a relatively large head 232, which may be rotated by an operator. The thumb screw 224 is positioned on a platform 240 behind the guard 244 of the nose assembly 28. The threaded shaft 228 of the thumb screw 224 extends through the platform 240 while the head 232 is supported above the platform 240. As shown in FIG. 29, the thumb screw 224 extends generally perpendicular to the cable axis 60. Accordingly, the thumb screw 224 may be threaded to extend to different depths to move closer or father away from the cable 44. For example, once the cable 44 is extended to a desired length, the thumb screw 224 may be threaded deeper into the drum 32 until it securely engages cable 44 and holds the cable 44 at the current extension position. Likewise, the thumb screw 224 may be threaded to a shallower depth within the drum 32 to disengage the cable 44.

Figure 31:
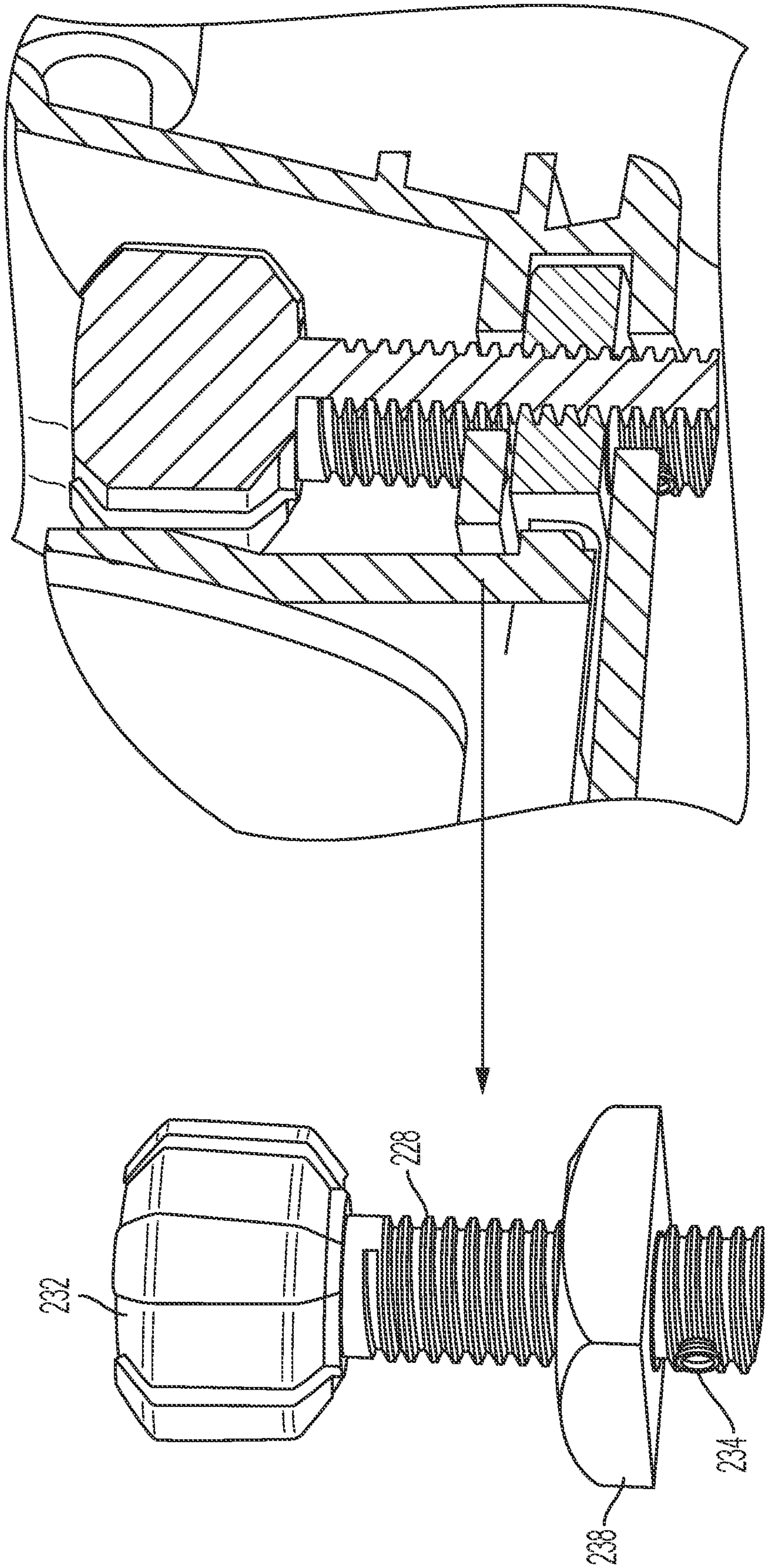
FIG. 31 is a detailed view of a cable lock according to one embodiment.

Referring to FIG. 31, in some embodiments, the cable lock 224 may include a retention system to prevent the cable lock 224 from de-threading out of the drain cleaner. In some instances, the screw 224 can be loosened to the extent that it may be susceptible to free falling out of the drain cleaner 20. One method of retaining the cable lock 224 is to use a set screw 234 in the threaded shaft 228. The set screw 234 may be a blind threaded set screw that only extends part way through the shaft 228. Alternatively, the set screw 234 may be a full length set screw that extends through the entire diameter of the threaded shaft 228. In other implementations, the retention system may include a spring pin, which can be pressed into a blind or a through hold in the end of the cable lock screw. In yet another implementation, glue or liquid cement may be used as a retention system to maintain the cable lock 224 within the drain cleaner. In yet another embodiment thread staking may be used to prevent dethreading.

Furthermore, in some embodiments, the nose assembly 28 may provide a guard 244, which at least partially shields the cable lock 224. The guard 244 may be formed from portions of the nose assembly 28. For example, the guard 244 may be formed by a flared portion of one or both the handle 30 and the trigger 192. For example, the guard 244 may include a flared portion 246 extending radially outward (e.g., upward in the figures) from the handle 30 to shield the cable lock 224 and inhibit the cable lock 224 from creating a hazard for the operator when the drum 32 is rotating. In the illustrated embodiment, the guard 244 extends in a direction generally perpendicular the cylindrical body of the nose handle 30 (i.e., perpendicular to the axis 60). As such, the cable lock 224 is positioned in a space between the front wall 48 of the drum 32 and guard 244 on the handle 30 of the nose assembly 28.

In some embodiments, the guard 244 only extends partially around the circumference of the nose assembly 28, while in other embodiments the guard 244 extends around the entire circumference of the nose assembly 28. The guard 244 shown in FIGS. 28-30 extends around only a portion of the nose assembly 28, however, a flared portion 256 of the trigger 192 provides additional protection from the movement of the cable lock 224. Specifically, the trigger 192 portion of the actuator 184 is shaped to form a secondary guard 248. The secondary guard 248 has a similar shape as the guard 244. The secondary guard 248 extends radially outward (e.g., downward in the figures) from the handle 30 to shield the cable lock 224 and inhibit the cable lock 224 from creating a hazard for the operator when the drum 32 is rotating. In the illustrated embodiment, the secondary guard 244 extends in a direction generally perpendicular the cylindrical body of the nose handle 30. As such, when the cable lock 224 rotates about the cable axis 60, the cable lock 224 is positioned in a space between the front wall 48 of the drum 32 and secondary guard 244 on the handle 30 of the nose assembly 28. The flared portion of the handle 30 and the flared portion of the trigger 192 are arranged so that they do not overlap significantly, and thus, can provide greater shielding for the cable lock 224 as it rotates 360 degrees about the cable axis 60.

In other embodiments, the drain cleaner 20 includes a single guard 252 that extends around the entire circumference of the nose assembly 1028 (FIGS. 6-10). For example, FIGS. 6-10 illustrate another embodiment of a guard 252 which extends radially outward (i.e., flares) from the handle 1030 of the nose assembly 1028. In this embodiment, the guard 252 includes a flared portion 256 that extends around 360 degrees about the cable axis 1060. The guard 252 forms a circular shroud, which shields the cable lock 224 as it rotates. Similar to the guard 244 and the secondary guard 248 shown in FIGS. 28-30, when the cable lock 224 rotates about the cable axis 1060, the cable lock 224 is positioned in a space between the front wall 1048 of the drum 1032 and guard 252 on the handle 1030 of the nose assembly 1028. Additionally, in the embodiment shown in FIGS. 6-10, the trigger 1192 has a shorter length and a slimmer profile than the trigger 192 shown in FIGS. 28-30 so that the trigger 1192 does not interfere with the guard 252. For example, in the illustrated embodiment, the trigger 1192 does not include a flared portion.

Figure 32:
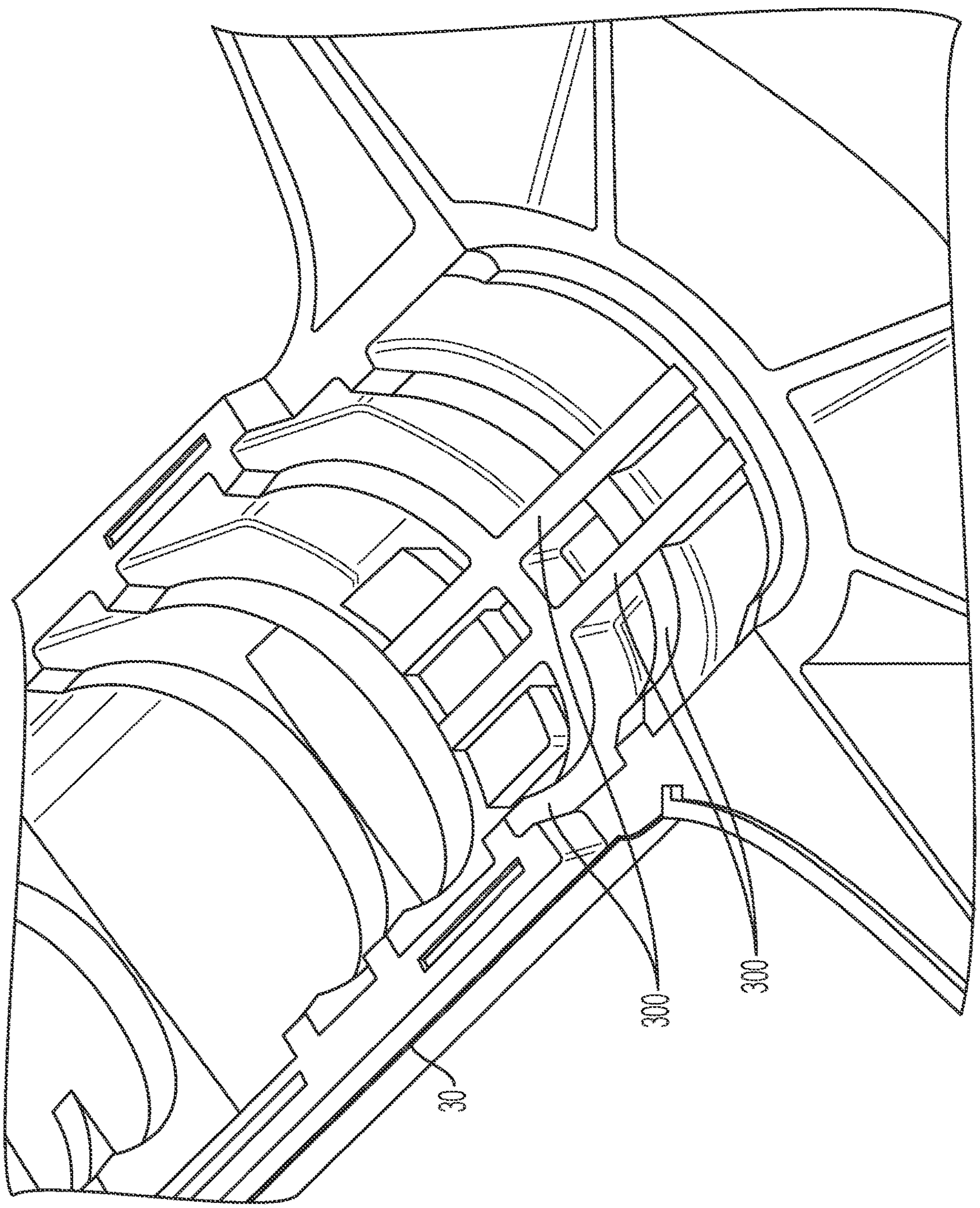
FIG. 32 is a detailed view of the inside of a nose assembly.

With reference to FIG. 32, the drain cleaner may include features to help reduce the wear between frictionally engaged surfaces. For example, the handle 30 extends circumferentially around the elongated body 64 of the drum 32 and may result in some wear due to the friction between the handle 30 and the elongated body 64. Therefore, in some embodiments, the handle 30 may be equipped with additional ribs 300 on the inside surface between the handle 30 and the elongated body 64. This will help distribute the friction between the handle 30 and the elongated body 64 so that the frictionally engaged portion is not concentrated in one area. This will reduce wear and increase the life of the drain cleaner. In the illustrated embodiment, the ribs 300 include an axial rib and two longitudinal ribs on each side of the handle 30 (e.g., the top inside surface and bottom inside surface).

Figure 33:
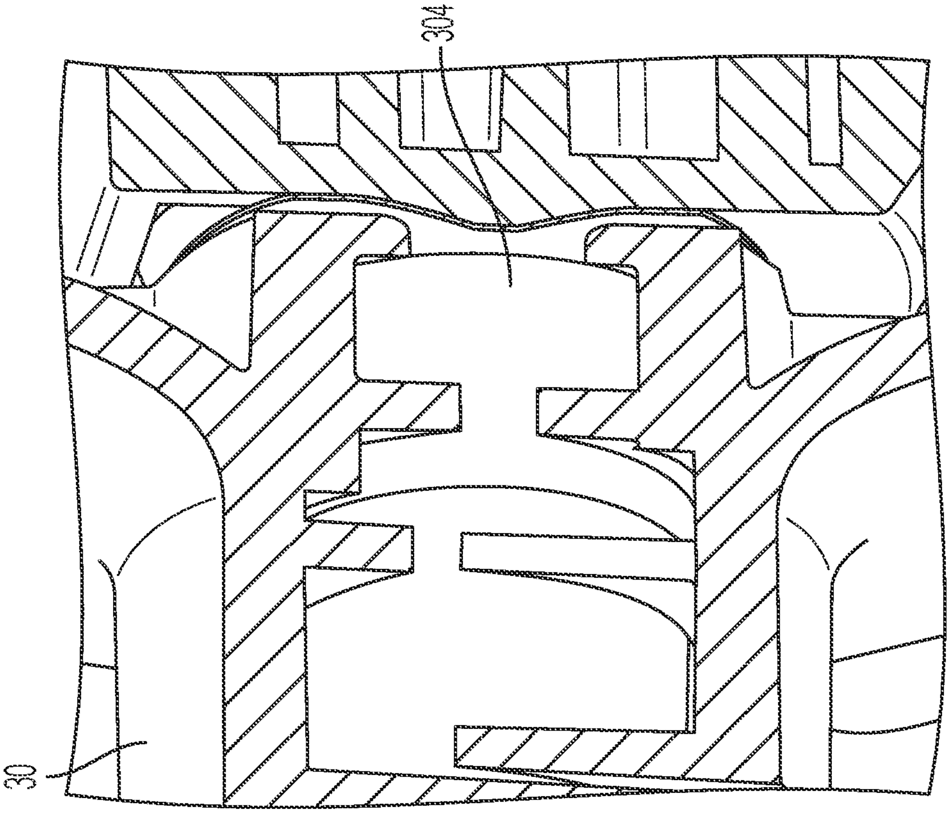
FIG. 33 is a partial cross-sectional view of the inside of a nose assembly according to one embodiment.

Another method of reducing wear is shown in FIG. 33. In the illustrated embodiment, a protective sleeve 304 is positioned between the handle 30 and the elongated body 64. In some implementations the protective sleeve 304 is formed of steel or other metal or high wear material. The protective sleeve 304 may extend along a portion of the handle 30 that is the most susceptible to wear from the elongated body 64 or may extend the entire length of the handle 30.

Although aspects have been described in detail with reference to certain preferred embodiments, variations and modifications exist within the scope of one or more independent aspects as described.

What is claimed is:

1. A drain cleaner comprising:

a drum rotatable about an axis of rotation, the drum including a rear wall and a bore formed in the rear wall;

a nose assembly extending forwardly of the drum;

a cable housed within the drum and extendable through the nose assembly;

a first drive mechanism disposed on the rear wall and configured to drive rotation of the drum, the first drive mechanism including a spindle that is insertable into the bore, the first drive mechanism driven by an external motor, the first drive mechanism being coaxial with the axis of rotation; and a second drive mechanism disposed on the rear wall at an off-center location and configured to drive rotation of the drum, the second drive mechanism movable relative to the drum between a stowed position and an operational position, the second drive mechanism manually driven by an operator;

wherein a portion of the rear wall surrounding the bore extends rearwardly from the drum a greater distance than the second drive mechanism when the second drive mechanism is in the stowed position.

2. The drain cleaner of claim 1, wherein the external motor is a motor of a power tool.

3. The drain cleaner of claim 1, wherein the second drive mechanism includes two opposing flat surfaces configured to provide ergonomic gripping.

4. The drain cleaner of claim 1, further comprising an autofeed mechanism configured to feed the cable into a drain.

5. The drain cleaner of claim 4, wherein the autofeed mechanism includes a plurality of rollers and an actuating member configured to move at least one of the plurality of rollers into engagement with the cable to feed the cable in a linear direction.

6. The drain cleaner of claim 5, further comprising a feed lock configured to selectively inhibit actuation of the autofeed mechanism.

7. The drain cleaner of claim 1, wherein the second drive mechanism is received in a recess of the drum when in the stowed position.

8. The drain cleaner of claim 1, wherein the first drive mechanism is configured to rotate the drum about the axis of rotation.

9. The drain cleaner of claim 1, wherein the second drive mechanism is pivotably coupled to the drum.

* * * * *